United States Patent
Schuster

(10) Patent No.: US 9,499,233 B2
(45) Date of Patent: Nov. 22, 2016

(54) MECHANISM FOR TRANSMITTING A ROTARY MOVEMENT WITH VARIABLE TRANSMISSION RATIO

(75) Inventor: Gregor Schuster, Baden (AT)

(73) Assignee: VYRO COMPONENTS GMBH, Baden (AT)

( * ) Notice: Subject to any disclaimer, the term of this patent is extended or adjusted under 35 U.S.C. 154(b) by 172 days.

(21) Appl. No.: 14/235,359

(22) PCT Filed: Jul. 18, 2012

(86) PCT No.: PCT/AT2012/050109
§ 371 (c)(1),
(2), (4) Date: Apr. 30, 2014

(87) PCT Pub. No.: WO2013/013256
PCT Pub. Date: Jan. 31, 2013

(65) Prior Publication Data
US 2014/0248982 A1 Sep. 4, 2014

(30) Foreign Application Priority Data
Jul. 27, 2011 (AT) .................. A 1100/2011

(51) Int. Cl.
*B62M 9/14* (2006.01)
*B62M 9/10* (2006.01)
(Continued)

(52) U.S. Cl.
CPC ................. *B62M 9/14* (2013.01); *B62M 9/06* (2013.01); *B62M 9/08* (2013.01); *B62M 9/10* (2013.01)

(58) Field of Classification Search
CPC .................................. B62M 9/10; B62M 9/14
See application file for complete search history.

(56) References Cited

U.S. PATENT DOCUMENTS 3,769,848 A * 11/1973 McGuire .................. B62M 9/14
474/70
4,127,038 A * 11/1978 Browning ................ B62M 9/10
280/236

(Continued)

FOREIGN PATENT DOCUMENTS

DE  8612893 U1  7/1986

OTHER PUBLICATIONS

International Search Report dated Oct. 25, 2012, issued in International Application PCT/AT2012/050109.

*Primary Examiner* — Minh Truong
(74) *Attorney, Agent, or Firm* — Fitch, Even, Tabin & Flannery LLP

(57) ABSTRACT

A control mechanism (800) for setting a transmission ratio between a traction means (812), in particular chain, and a wheel set that is rotatable about a wheel axle and includes two or more wheel blades (810, 820, 830), in particular sprocket blades, adjusts the wheel rim sectors relative to a fixed plane of the traction means in a direction transverse to the plane of alignment. At least one of the wheel blades is composed of a plurality of independently adjustable wheel rim sectors (802, 803). By means of a control component (807) mounted decoupled from a rotary movement of the wheel set, a plurality of co-rotating thrust elements (804, 805) are each displaced via rotation-free couplings between a first and a second position at least in the axial direction, wherein each of the wheel rim sectors is connected in a rotationally fixed manner to a respectively associated thrust element. The first position of a thrust element corresponds to the position of the associated wheel rim sector outside the plane of alignment, whereas a thrust element located in the second position exerts on the respective wheel rim sector, at least as long the latter is outside the plane of the traction means, a force for displacing the respective wheel rim sector into the plane of alignment, thus shifting the same into the plane.

12 Claims, 14 Drawing Sheets

(51) Int. Cl.
    *B62M 9/06*    (2006.01)
    *B62M 9/08*    (2006.01)

(56) References Cited

U.S. PATENT DOCUMENTS

| | | | |
|---|---|---|---|
| 4,571,219 A * | 2/1986 | Breden | B62M 25/00 474/70 |
| 4,580,997 A * | 4/1986 | Browning | B62M 9/14 474/160 |
| 4,592,738 A * | 6/1986 | Nagano | B62M 9/14 474/162 |
| 4,634,406 A | 1/1987 | Hufschmid | |
| 4,713,042 A * | 12/1987 | Imhoff | B62M 9/14 474/69 |
| 5,152,720 A * | 10/1992 | Browning | B62M 9/1242 474/80 |
| 5,205,794 A * | 4/1993 | Browning | B62M 9/14 474/160 |
| 5,354,243 A * | 10/1994 | Kriek | B62M 9/14 474/135 |
| 2002/0084618 A1 | 7/2002 | Lerman et al. | |

\* cited by examiner

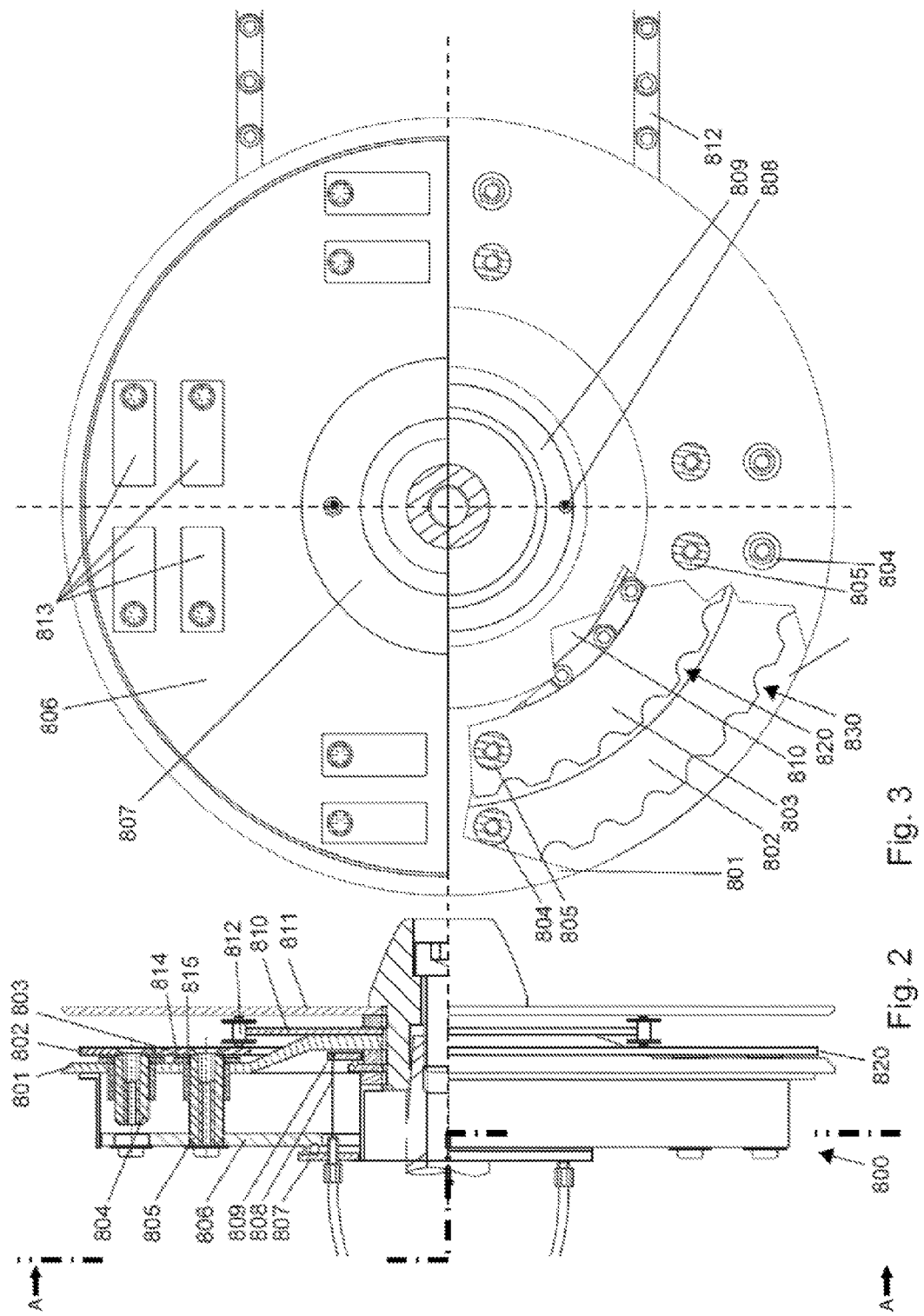

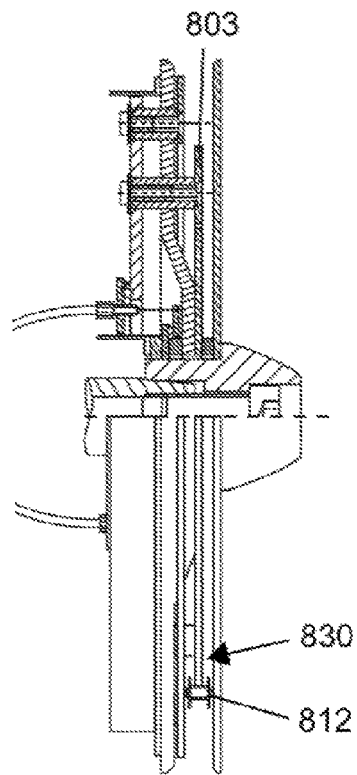
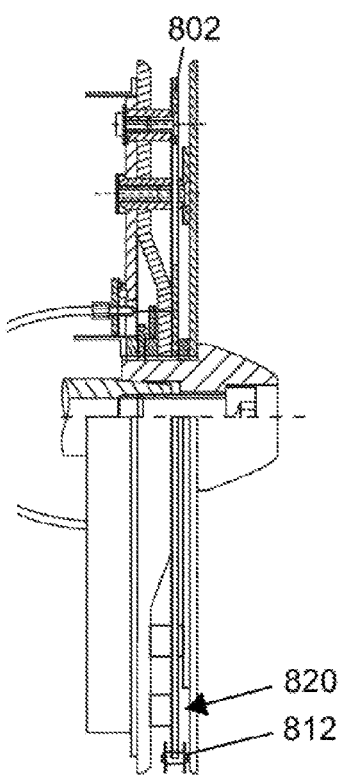
Fig. 4
Fig. 5
Fig. 6
Fig. 7
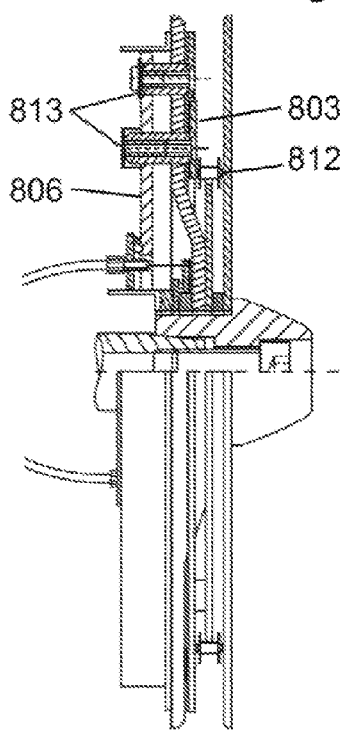
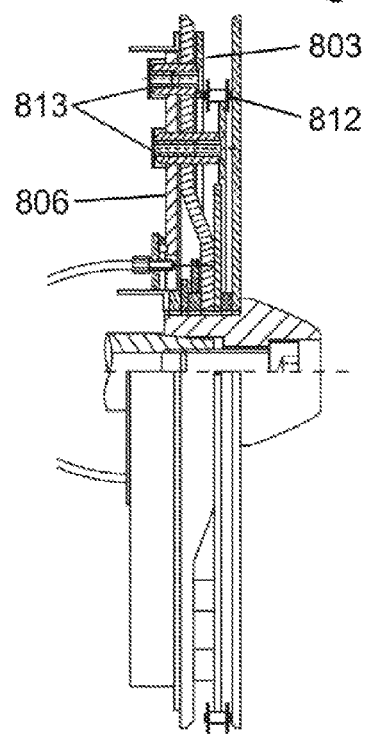

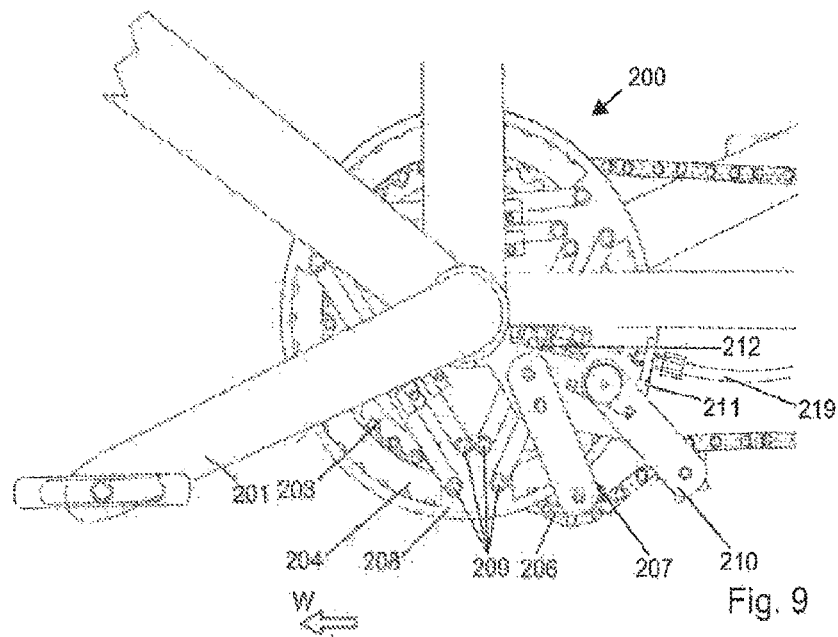
Fig. 9
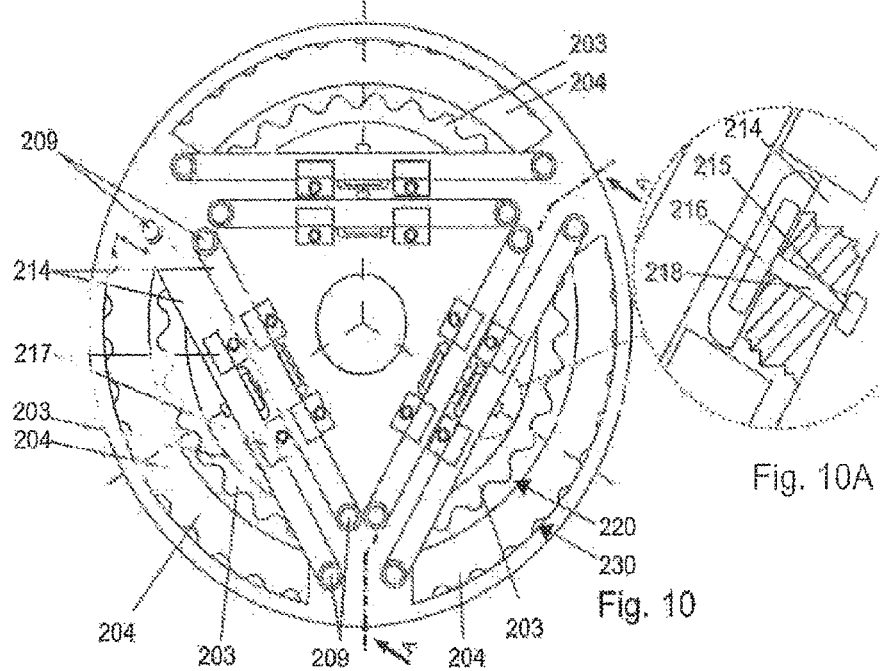
Fig. 10A
Fig. 10

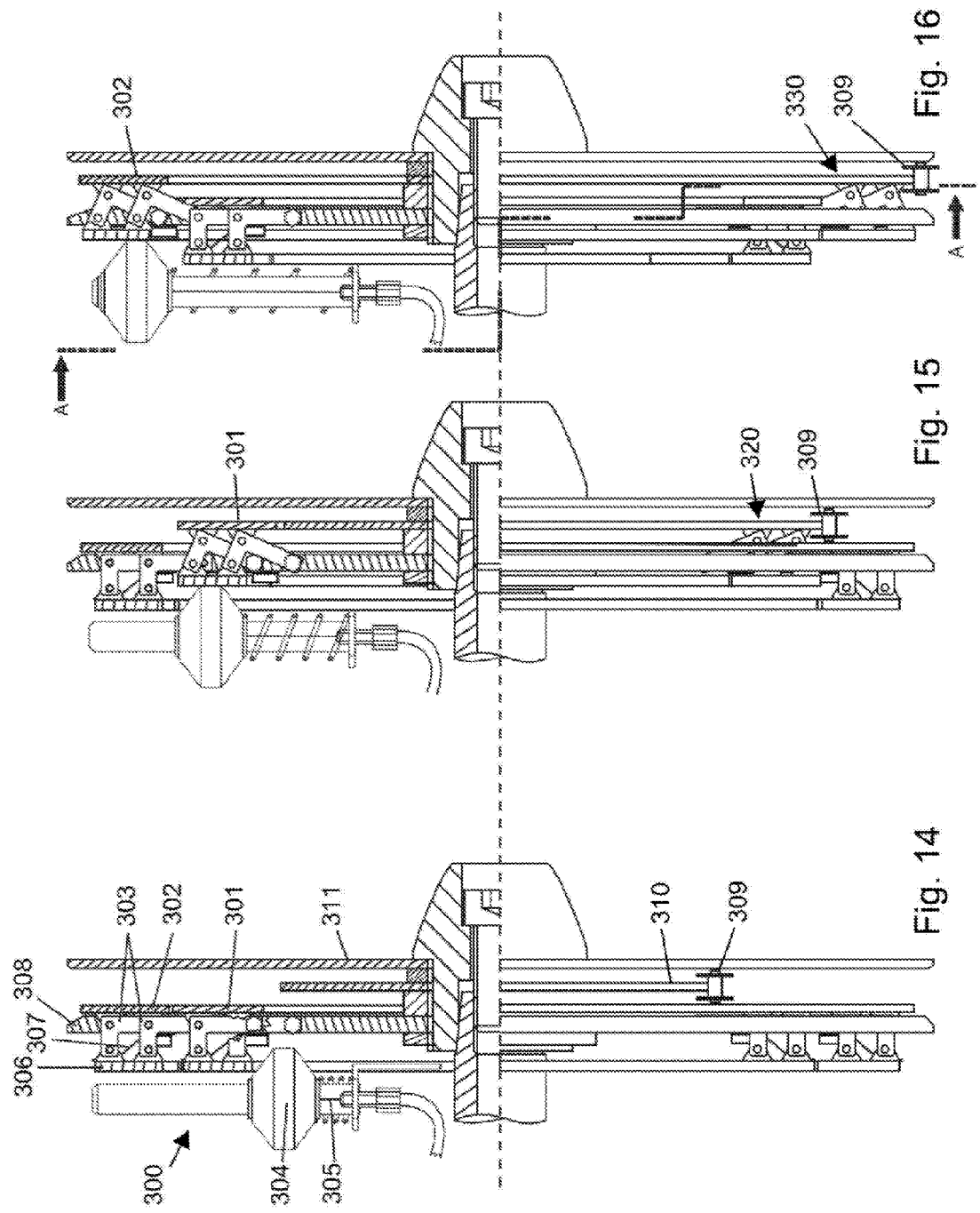

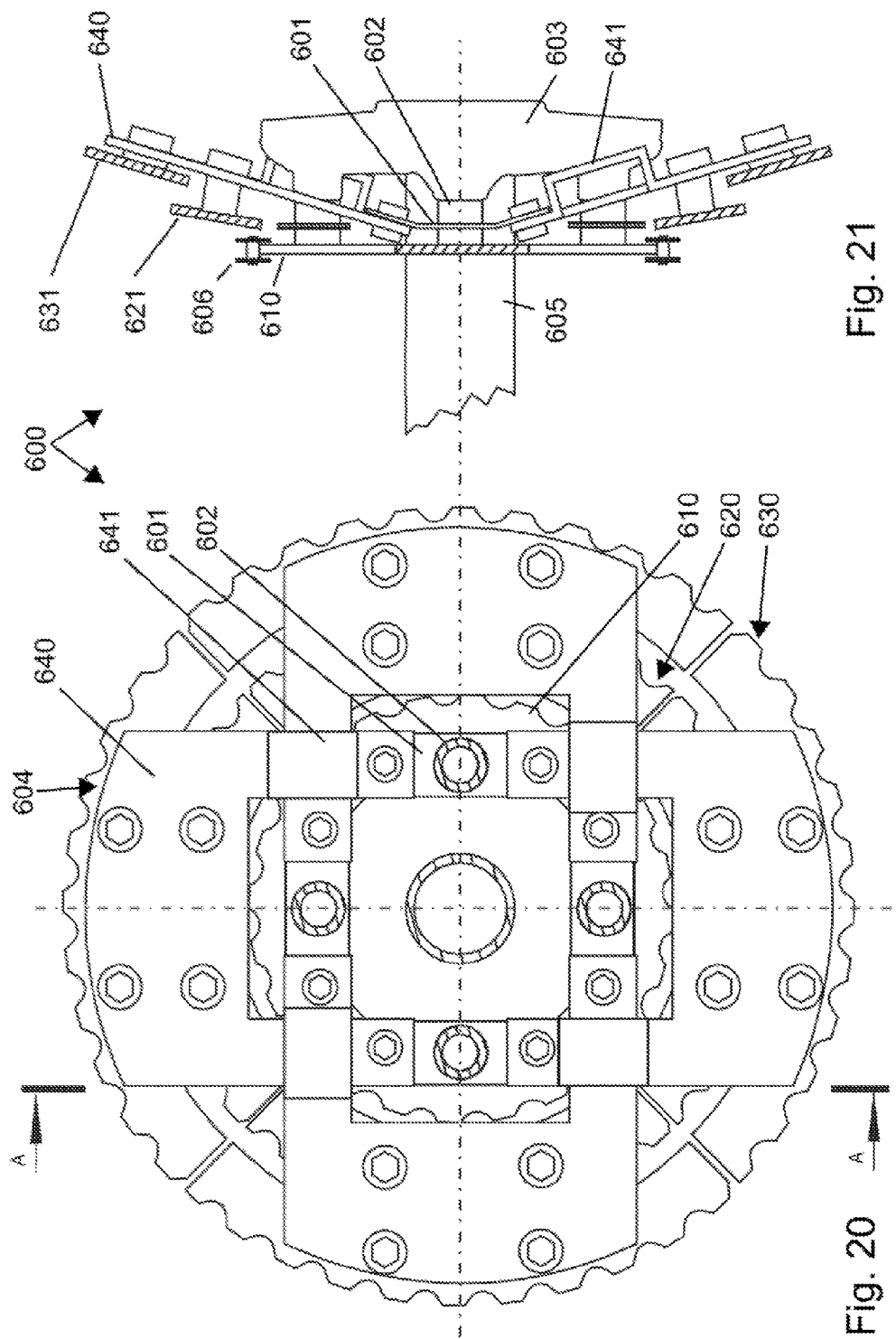

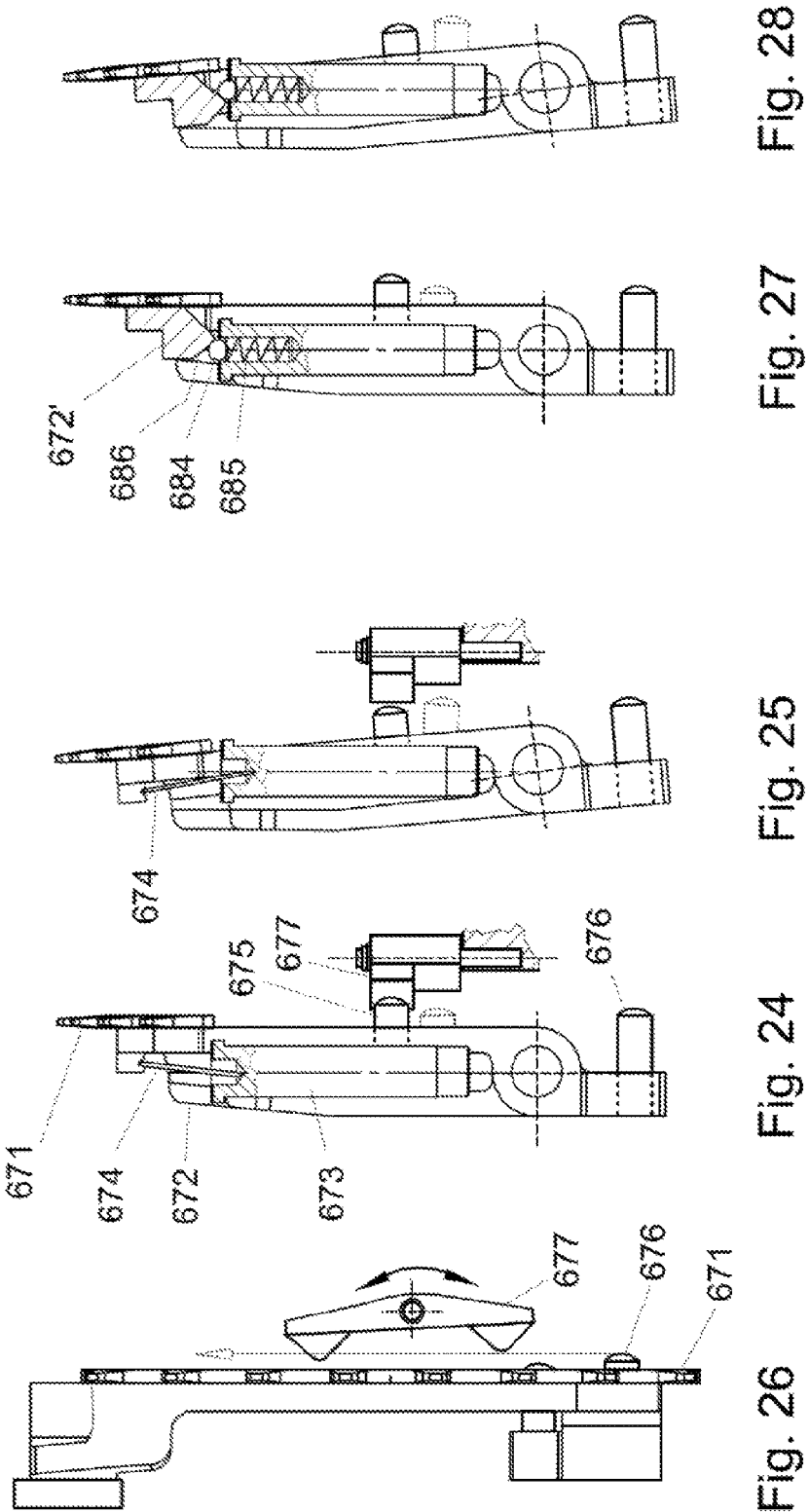

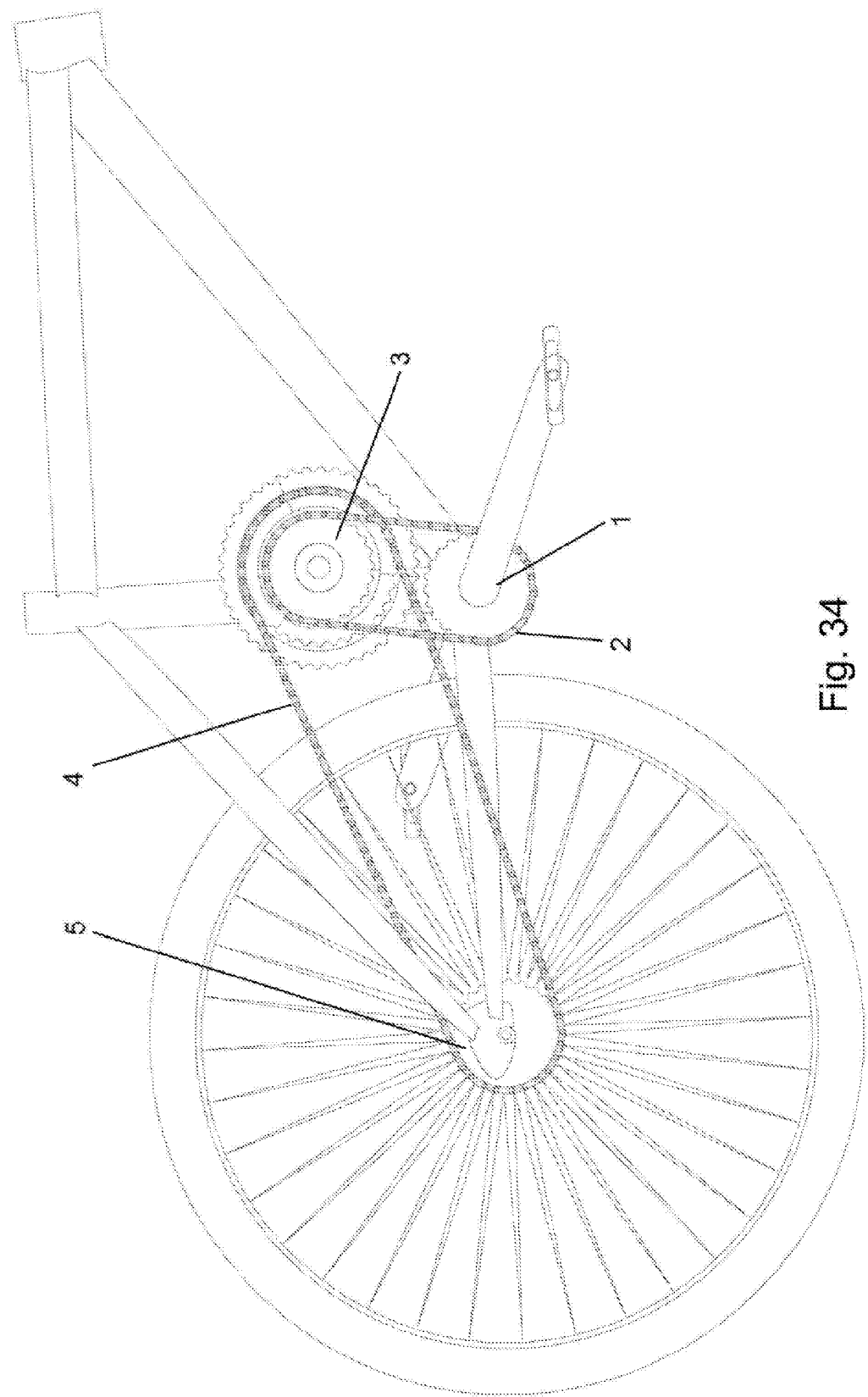

MECHANISM FOR TRANSMITTING A ROTARY MOVEMENT WITH VARIABLE TRANSMISSION RATIO

CROSS-REFERENCE TO RELATED APPLICATIONS

This Application is a U.S. National Stage Application filed under 35 U.S.C. §371 of International Application PCT/AT2012/050109, filed Jul. 18, 2012, designating the United States, which claims priority from Austrian Patent Application A 1100/2011, filed Jul. 27, 2011, the complete disclosures of which are hereby incorporated herein by reference in their entirety for all purposes.

FIELD OF THE INVENTION AND TECHNOLOGICAL BACKGROUND

The invention relates to the field of multistage gearings used for power transmission by continuous, articulated or flexible traction-transmitting means such as a belt or a chain. More particularly, the invention is directed to a control mechanism for setting a transmission ratio between a traction means, e.g. a chain or a belt, and a wheel set that is rotatable about a wheel axle and includes two or more wheel blades. A selected one of the wheel blades is wrapped around by the traction means; at least one of the wheel blades is composed of a plurality of independently adjustable wheel rim sectors, wherein the control mechanism causes the adjustment of the wheel rim sectors relative to a fixed plane in which the traction means wraps around the wheel set, in a direction substantially transverse to said plane.

The invention is concerned with the idea to change the transmission ratio in power transmission devices comprising sectored, divided or interrupted drive and/or driven wheels—or blocks consisting of such wheel components. Such transmissions are, for instance, known in gearshifts of bicycles, wherein a transmission between the wheel and the traction means takes place twice, namely once from a crank wheel to a chain, and once from the chain to the drive wheel (which is usually the rear wheel of the bicycle).

Several solution principles are known for variable transmission ratios.

A first known approach consists in a derailleur gear. Such systems are sufficiently well-known (cf. e.g. U.S. Pat. No. 3,448,628). A derailleur guides the chain and moves it axially on the chain blades with different diameters, which are adjacently located on an axle. Thereby, the transmission ratio is changed relative to the chain movement, and consequently relative to a further chain blade aligned with the chain (which corresponds to the driven wheel or the power-output wheel).

In doing so, disadvantages frequently arise in that the chain is moved out of alignment, which will cause a higher friction in the chain, or a higher load on the chain, thus resulting in material fatigue. A further disadvantage consists in that the chain is partially present on two chain blades during the shifting procedure, which is why no power can be transmitted during that time. Shifting during load operation is thus not possible; rather has the driving power to be minimized during a shifting procedure in order to enable a shifting procedure to be performed without material damage. In order to realize large transmission ratios, i.e. enable chain blades having diameters largely varying in size to be arranged on an axle, it is necessary to arrange several chain blades increasing in terms of size in conical form so as to be usable as lifting aid by the chain, even though they will not actually be required for the transmission. In addition, vibrations may cause the chain to skip to adjacent chain blades, which will again cause problems during load operation.

Moreover, when providing two derailleur gears in a gear stage, i.e. both on the driven and on the power-output axles, in order to realize particularly versatile and/or large transmission ratios, it is to be made sure that the chain blades be selected such that the chain will not run too much out of alignment, since this would involve high material stress. Another disadvantage is that the derailleurs are usually located on exposed sites, as is frequently the case particularly in bicycles, and are therefore prone to damage during cross-country rides, e.g. by bushes. Due to the plurality of axially adjacently arranged chain blades, derailleur gears also require relatively much space, which will again prevent a gearshift having the full range of transmission ratios from being realized on the crankshaft, which is better protected, yet very limited in terms of space.

An alternative approach comprises gearshifts. There, a change in the transmission ratio is accomplished by a sprocket gear, for instance a planetary gear; the chain drive merely serves as a power-transmitting element. Such systems are primarily used in the rear-wheel hub of a bicycle. The drawback in that case is the high weight that such sprocket gears have, and the high constructive and economic expenditures.

Another alternative approach uses bevel gears and step or cone pulleys. In that case, substantially two stepped or conically shaped discs are provided, between which the traction medium runs. By changing the axial distance of the discs, the traction medium is forced onto different radii of contact thus changing the transmission ratio. This principle is only suitable for frictionally engaged, but not for positively engaged traction media such as chains or toothed belts.

By contrast, the invention is based on the idea of using multistep chain gears with sectored, divided and/or interrupted sprockets. Here, the drive or driven wheel under consideration is virtually divided into components that are successively brought into alignment with the chain. The traction means, by contrast, is moved in a fixed plane, a lateral movement of the traction means being not required or even prevented. In the following, the plane in which the traction means extends will be referred to as "plane of the traction means" or, briefly, "plane of alignment".

FIG. 1 illustrates the already known principle underlying the present invention, of changing the transmission ratio by axially feeding sectors into the alignment of the traction medium. Shown is a wheel set 101 with three wheel blades 110, 120, 130 each corresponding to a drive or driven disc for a respective transmission ratio or "speed". While the innermost wheel blade 110 is undivided and axially fixed, the central wheel blade 120 and the outer wheel blade 130 are each divided into sectors 102, 103 (usually corresponding to circular ring sectors), i.e. each into three sectors corresponding to an angle of almost 120° in the illustrated example. The angle is slightly smaller than 360°/n (here, n=3) in order to allow for a play between the individual sectors. The sectors 102, 103 are mounted so as to be relatively movable along the direction of the axis 105, yet rotationally fixed in respect to the rotation. Such mounting is realized via suitable means, e.g. a pivot guide 104 or the like.

From FIG. 1, the start of a shifting procedure from the speed of the smallest wheel 110 to that of the central wheel 120 is apparent. The chain 106 still wraps around the wheel blade 110. One or more guide rollers 107 serve to enlarge the angular region that is not wrapped around by the chain 106. A first sector 102a of the central wheel blade 120, i.e. the one which is currently located in the unwrapped angular region, is coupled into the alignment of the chain 106. During the rotary movement of the wheel set, sector 102a will receive the chain. After this, the remaining sectors of the wheel blade 120 can be similarly coupled into alignment with the chain as soon as they have each reached the respective angular region that is not wrapped around; after this has been achieved for all sectors 102, the change to the speed corresponding to the central wheel 120 is completed.

This approach, which is based on the use of sectored, divided and/or interrupted wheel rims, overcomes the drawbacks of the previously mentioned approaches. Shifting during load operation is possible, since the chain is in engagement with the chain blades of both transmission ratios (and only with these) even during the shifting procedure. The space demand of such gearshifts can be reduced.

Some solutions are based on the principle of temporarily displacing the divided, sectored or interrupted sprockets only during the shifting operation proper, in order to "take" the chain onto the next-larger or next-smaller diameter. Such solutions are, for instance, described in U.S. Pat. Nos. 4,127,038 or 4,580,997. There, the chain is aligned with the next chain blade by pivoting in, or axially moving, the next-adjacent larger or smaller chain blade sector. The alignment of the chain will thus change at a change of the transmission ratio.

CH 617 992 A5 shows a principle by which the chain blade sectors are gradually fed into the alignment of the chain. The chain blade sectors are individually mounted on a co-rotating device by the aid of pins. Thereby, a smaller construction has become possible. This basically enables the construction of a derailleur gear providing the whole spectrum of transmission ratios just on a single axle.

All of the presently known principles have in common that the movement of the chain blade sectors is achieved by a contact of the rotating part, e.g. via pins, with a fixed part, i.e. a part immovable relative to the rotating unit on which the sectors are located, e.g. a radially movable carriage. This involves the disadvantage of a constant contact, and hence friction, persisting during the operation of the system. In addition to an undesired load and wear, this will also lead to the generation of noise. This renders such principles uncomfortable in practice and does not constitute a viable solution.

That known solution involves the problem of how the feeding of the chain blade sectors into the alignment of the chain by the actuation of individual pins takes place. Since every sprocket sector has to be mounted on two or more pins, the latter will tend to jamming if only one pin is actuated, and render impossible any movement of the toothed sectors. In order to avoid this, CH 617 992 A5 also shows the mounting of quarter-circle sectors on three pins each, and a mechanism that is to enable the pivoting-in of the pins (as opposed to a parallel guidance of the sectors). The guidance and meshing of three pins per sector, however, involves the disadvantage that an excursion of a sector is not possible without inacceptable expenditures. Another problem relates to how the individual sectors are to maintain their positions in or out of engagement after having left the stationary guide carriage. In this respect, none of the known solutions offers an approach that is effective in practice.

A variant of the last-discussed approach is also described in CH 617 992 A5, namely that the sprocket sectors of varying sizes are mounted on a common, radially arranged pin and pivoted into alignment with the chain. This solution does not involve the problem of jamming of the guide pins. However, what is disadvantageous is the relatively high space demand, since the individual sectors have to be pivoted out at relatively large angles in order to completely leave the region of the running chain. In addition, this solution involves the drawback of the force for a gear change having to be introduced by contacts between stationary and rotating parts. This will again cause the already mentioned friction and noise generation.

BRIEF DESCRIPTION OF THE INVENTION

It is, therefore, the object of the invention, departing from the idea to use sectored, divided and/or interrupted sprockets, to overcome the disadvantages pointed out above. To the extent possible, the contact between stationary and rotating components is to be avoided while an operationally safe and compact mode of construction is, at the same time, to be enabled.

This object is achieved by a control mechanism according to the claims, the independent claims defining basic characteristic features of the invention and the dependent claims describing advantageous further developments and configurations. The control mechanism according to the invention is particularly suitable for a gearshift in which the control mechanism is mounted to a gearwheel, for instance a gearwheel that serves as the drive wheel of a bicycle gearshift. The control mechanism according to the invention can, however, also be used in a transmission gear to be arranged between a driving gear group and a driven gear group of a vehicle, in particular bicycle.

The object is, in particular, achieved by a control mechanism of the initially-defined kind, comprising at least one control component mounted decoupled from a rotary movement of the wheel set (and hence stationary) and a plurality of (co-rotating) thrust elements, wherein a thrust element is each associated to the wheel rim sectors and each of the wheel rim sectors is connected to the respectively associated thrust element via a resilient connection so as to be rotationally fixed relative to the rotation about the wheel axle. The control components are arranged to displace the thrust elements each via rotation-free couplings between a first and a second position at least in the axial direction, wherein the first position of a thrust element corresponds to the position of an associated wheel rim sector outside the plane of the traction means, whereas a thrust element being in the second position exerts on the respective wheel rim sector—at least as long the latter is outside the plane of the traction means—a force for displacing the respective wheel rim sector into the plane of the traction means (thus shifting the same into the plane) via said resilient connection.

This solution according to the invention provides the constant mounted engagement of, and the avoidance of recurring contacts between, the rotating and stationary units in a gearing represented by the invention. Sectored, divided or interrupted drive/driven wheels or gear units combined to blocks can be guided for axial movement, or mounted for pivotal movement about a center of motion, or by the aid of a spring element, on a carrier plate. It is only during the shifting operation proper that a brief contact between stationary and rotating units will occur in the second-mentioned configuration. The invention also comprises various aspects for changing transmission ratios, which will be explained below by way of exemplary embodiments.

As usual in the field of traction means drives, a "traction means" in the context of the invention is meant to denote a flexible transmission means under tension that connects several shafts for transmitting rotary movements of the shafts. To this end, the traction means wraps around a defined angular region of at least a drive wheel and/or at least a driven wheel. In general, the traction means is belt-shaped and, as a rule, continuous (usually closed in a loop); the traction means is typically comprised of a chain, a belt, a toothed belt or the like, each being able to cooperate with a wheel rim of the wheel set in a form-locking and/or force-locking manner.

In the context of the invention, the term "wheel rim sector" moreover serves to denote a component of a drive or driven wheel, which component comprises only a portion of the circumferential surface by which the traction means enters into form-locking and/or force-locking contact. To each wheel rim sector can thus be associated an angle about the axle of the wheel, which angle corresponds to the extent of wrap by the traction means. The division of a wheel rim into wheel rim sectors will, in particular, also allow for a gap between the individual sectors if this makes sense for the embodiment in question. In this respect, it is irrelevant whether the wheel is a sprocket or toothed wheel, a friction wheel or the like. The angle of a wheel rim sector is generally smaller than 180°, and typically said angle is equal to 360°/n (wherein n=3, 4, 5, 6, . . . , and hence an integer from 3) or slightly smaller as a function of the gap between sectors.

In the gearings envisaged by the invention, only either the driving gear part or the driven gear part on the traction means is considered in most cases. The respectively other gear part can then be suitably realized in a manner way known from the prior art or according to the invention.

In an advantageous further development of the control mechanism according to the invention, the thrust elements are each connected to the respectively associated wheel rim sectors and/or the control component by a resilient connection. Such a resilient connection provides for a play in the axial direction. This enables a thrust element being in the second position to exert on the respective wheel rim sector (at least as long as the latter is outside the plane of the traction means) the force for displacing the respective wheel rim sector into the plane of the traction means via said resilient connection. A certain play will thus be introduced during the shifting procedure: In particular when the respective wheel rim sector happens to be in an angular region corresponding to a region wrapped around by the chain (or the belt), immediate coupling into the central traction plane will not be possible; the resilient connection will allow for the delayed introduction of the sector into the plane. The same applies inversely when a sector is again shifted out of the plane, as long as the respective sector is (at least partially) wrapped around. Overall, the shifting procedure will be facilitated by the resilient connection, and an activation of the control mechanism will be enabled irrespective of the current angle of rotation of the wheel.

In order to prevent the traction means from evading from the side from which the wheel rim sectors are coupled into the plane of the traction means, an edge plate extending in parallel with the plane of alignment will be beneficial. It may advantageously be mounted so as to co-rotate with the wheel set.

In order to assist the return movement of the wheel rim sectors from the plane of alignment into their resting position, additional spring elements can be of advantage, which are preferably configured as leaf springs. These will cause the reliable return of the wheel rim sectors into a resting position outside the plane of alignment when the associated thrust element assumes its first position.

Guide elements configured, for instance, as guide pins and/or tilting brackets can be associated to the wheel rim sectors. They will define the substantially axial movement of the wheel rim sectors due to the introduction of force by the respectively associated thrust element, and hence ensure a defined path of the wheel rim sectors during their displacement between an "active position" in the plane of alignment and a "resting position" outside the plane of alignment. These guide elements will, in particular, prevent any undesired rotary movement of the wheel rims about the rotating axle. These guide elements will, as a rule, define the movement of the wheel rim sectors in the sense of a lateral displacement (i.e. in the axial direction), optionally with a small additional radial component, the latter being maintained in parallel with the plane of alignment.

The wheel rim sectors may, however, also be adjusted by a tilting movement. Such wheel rim sectors that are tiltable relative to the plane of alignment can be (indirectly or directly) fastened to the shaft by means of a spring, which exerts a force onto the wheel rim sectors for movement out of the plane of alignment.

In order to facilitate the shiftable retention in the "active position", the wheel rim sectors may comprise firmly connected (at least in the axial direction) guide projections engaging an associated guide web (extending in a ring-sector-like manner along a circumferential direction) when the respective wheel rim sector is in the plane of alignment, said guide web being mounted decoupled from a rotary movement of the wheel set.

The wheel blades, as a rule, have different circumferential radii, wherein the wheel blade having the smallest circumferential radius may preferably be undivided. In such a case, the smallest, undivided wheel blade is advantageously mounted on the wheel set so as to be immovable in the axial direction.

The undivided wheel blade may, moreover, comprise at least one opening, in particular in its inner region within its rim region (sprocket). Through this (these) opening(s) may extend at least one thrust element and/or at least one connection element associated thereto and serving to connect the thrust element to the respective wheel rim sector. This corresponds to a "passage" of the control mechanism (or, to be more precise, the thrust and/or connection element) through the smallest wheel blade.

According to another inventive aspect, wheel sectors each located in the same angular region can be combined to a sector block, with the respectively associated wheel sectors preferably mounted in a rotationally fixed manner, for instance by riveting or soldering. The wheel sectors of a sector block may, in particular, be rigidly connected or even designed in one piece (e.g. as a single, milled component). The wheel sectors of a block, as a rule, have radii decreasing outwardly along the axial direction from one wheel sector to the next; in special cases, increasingly larger radii might also be provided. It should be noted that, according to this and the following aspects of the invention, sector blocks in a control mechanism for a gearshift can be realized with control component(s) and several (co-rotating) thrust elements of the described type even irrespective of the presence of a control mechanism.

In order to achieve an encapsulation of the toothed sectors, in particular in the previously mentioned case where the wheel sectors of identical angular regions are combined to sector blocks, a casing may be provided. The casing may be arranged about the wheel axle—preferably in a rotationally fixed manner with the wheel sets of the wheel rim sectors—and surround a cavity at least partially located laterally of the plane of alignment; parts of the sector blocks located outside the plane of alignment can be moved into said cavity, preferably in the axial direction. Such a casing can, for instance, serve as hub-side connection site for the spokes or wheel disc of a wheel rotating about the wheel axle, or can be arranged within a hub shell, to which the spokes or the wheel disc are connected on the side of the hub. Furthermore, the cavity may extend into an axial region corresponding to the axial position of the spokes or wheel disc, respectively.

In combination with such encapsulation, or independently thereof, the control component(s) mounted decoupled from the rotary movement of the wheel set may be received in a central cavity extending along the wheel axle so as to be linearly adjustable along the wheel axle; in doing so, the rotationally free coupling may favorably be realized by thrust element projections projecting into the central cavity and engaging the control component(s).

According to another inventive aspect, the wheel rim sectors can be tiltable relative to the plane of alignment by the aid of retaining elements that are themselves mounted to tilt at small angles. These retaining elements can be mounted close to the axle, i.e. in a manner pivotable about an axis of rotation extending transversely to the wheel axle, and extend outwardly therefrom, wherein the wheel rim sectors are attached to outer regions of the retaining elements—either directly or optionally via carrier components.

In addition, the wheel rim sectors can be equipped with spring elements to ensure fixation in the stop positions. In this case, each of the spring elements will cause the switching of the respectively associated wheel rim sector between a position within the plane of alignment and a resting position outside the plane of alignment.

Still another aspect of the invention relates to a control mechanism including a gearshift with wheel sets or wheel blades divided into wheel rim sectors, of the initially defined kind, wherein the wheel set sectors are movable through the plane of alignment of the chain in the axial direction. In a preferred manner, the wheel rim sectors are combined to sector blocks of the already mentioned type, and/or they can be moved within a cavity defined by a casing (located e.g. on the site of the hub). The wheel rim sectors may, moreover, be arranged in such a manner as to be displaced, at the axial movement, through the plane that corresponds to the plane of the wheel spokes. This will result in a particularly favorable exploitation and saving of space in the wheel that is provided with a gearshift of this type. In the encapsulated case, the cavity may to this end project into an axial region that corresponds to the axial position of the spokes or wheel disc, respectively. It should be pointed out that this aspect of a control mechanism/gearshift can also be realized irrespective of the presence of a control mechanism including control component(s) and (co-rotating) thrust elements of the already described type.

BRIEF DESCRIPTION OF THE DRAWINGS

In the following, the invention along with further particulars and advantages will be explained in more detail by way of preferred, non-limiting exemplary embodiments of the invention, which are illustrated in the accompanying drawings. Therein.

FIG. 2 is a front view of a gearing according to a first exemplary embodiment;

FIG. 3 is a rear view of the gearing of FIG. 2, partially sectioned along line A-A of FIG. 2;

FIG. 4 illustrates the gearing of FIGS. 2 and 3 shifted into the second gear;

FIG. 5 illustrates the gearing of FIGS. 2 and 3 shifted into the first gear;

FIG. 6 depicts the gearing of FIG. 4, wherein a sprocket sector associated to the second speed has not yet been coupled into alignment with the chain;

FIG. 7 depicts the gearing of FIG. 5, wherein a sprocket sector associated to the first speed has not yet been coupled into alignment with the chain;

FIG. 9 is a rear view of the gearing of FIG. 8;

FIG. 10 is a front view of the mechanism of the gearing of FIGS. 8 and 9;

FIG. 10A is a detailed sectional view of the switch cam of the mechanism according to FIG. 10;

FIG. 14 illustrates a further exemplary embodiment of a control mechanism in front view, with the mechanism changed into the gear of the innermost sprocket wheel;

FIG. 15 depicts the control mechanism of FIG. 14 changed into the gear of the central sprocket wheel;

FIG. 16 depicts the control mechanism of FIG. 14 changed into the gear of the outermost sprocket wheel;

FIG. 20 illustrates a further exemplary embodiment comprising a nested bracket of toothed sector blocks in side view from outside;

FIG. 21 is a sectional view of the mechanism along line A-A of FIG. 20;

FIGS. 24 to 28 illustrate the mode of operation of a stop position fixation;

FIG. 34 depicts a gearing in front view on a bicycle, wherein a gearshift according to the invention is arranged in an intermediate gear.

DETAILED DESCRIPTION OF EXEMPLARY EMBODIMENTS OF THE INVENTION

Figure 1:
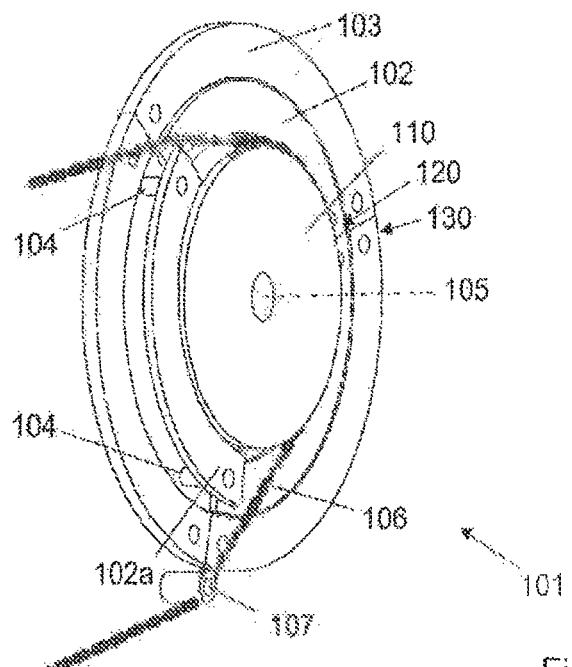
FIG. 1 is a perspective view of a wheel set with sectored wheel blades according to the prior art.

A first aspect of the invention avoids contact, as far as possible, between stationary and rotating units in that the mechanism effecting the displacement of the sectored, divided or interrupted sprockets is in constant engagement with the rotating unit in a rotationally decoupled manner. According to the invention, this rotationally decoupled control mechanism is made possible in that the stationary part of the mechanism is configured to be rotationally decoupled relative to the rotating part by double mounting. This type of operation overcomes the drawback of known solutions comprising the repeatedly occurring contact between rotating parts and the relatively stationary part.

In the following, this will be demonstrated by way of an example, which is illustrated in FIGS. 2 to 7 and constitutes an embodiment of a simplified gearing according to the invention comprising three gears and the associated control mechanism 800.

FIG. 2 is a front view of the gearing, i.e. viewed in the direction perpendicular to the axis of rotation of the gearing; the upper part is a sectional view, with the plane of section extending through the axis of rotation. In FIG. 2, the (inwardly oriented) rear side of the assembly is on the left side. FIG. 3 illustrates a rear view of the gearing, i.e. along the axis of rotation of the gearing from inside, partially sectioned (line A-A in FIG. 2); in the left upper quadrant, a portion is moreover shown in the opened state (carrier plate removed), thus rendering the toothed sectors visible.

On a carrier plate 801 are provided three sprocket blades, namely an innermost sprocket 810 and two sprockets 820, 830 concentric with the innermost sprocket. First and second speeds are realized by the sprockets 820 and 830, respectively, while the third speed is provided by the smallest sprocket 810, which in this case is axially immobile and undivided. FIG. 2 depicts the chain 812 running on the sprocket 810. Towards outside, an edge disc 811 serves both as a guide disc for guiding the chain 811 and as an abutment for axial forces exerted on the chain.

The sprockets 820, 830 are each realized by a number of toothed sectors, i.e. four quarter-circle toothed sectors 802 and 803 each in the illustrated example. In the exemplary embodiment illustrated, the toothed sectors 802, 803 are guided by stepped guide pins 804, 805, respectively, as will be described in detail below. The guide pins 804, 805 can advantageously be configured as pins sealed against dirt by seals 814 and guided with a clearance fit in guide sleeves 815 pressed into the carrier plate 801. In this manner, a high force can be taken over by the guide.

An actuation plate 806 is arranged so as to be axially movable in parallel with the carrier plate. To this end, it is mounted on the guide pins 805 (i.e. the longer guide pins) via interposed leaf springs 813. The leaf springs 813 associated to the guide pins 804, 805 are apparent from the rear view of FIG. 3. The actuation plate is surmounted by a rotationally decoupled shift ring 807; a traction cable 808 passed therethrough is fixed to the similarly mounted anchor plate 809. A force can be introduced by the shift ring 807 via the traction cable 808, when the latter is tensioned and thus causes the shift ring 807 to approach the anchor plate 809, which force results in the actuation plate 806 bringing the guide pins 804, 805, and hence the toothed sectors 802, 803, in alignment with the chain. The shift ring thus acts as a control component for actuating the mechanism and the guide pins as thrust elements associated with the toothed sectors. In the illustrated, preferred three-speed configuration, this occurs in two steps as depicted in FIGS. 4 to 7 (each in a front view analogous to FIG. 2).

FIG. 4 depicts the gearing in a state shifted into the second gear. There, the toothed sectors 803 of the central sprocket 830 (i.e. the smaller one of the two sectored sprockets) are fed in the non-wrapped around region of the chain 812.

FIG. 5 depicts the gearing in a state shifted into the first gear. There, the toothed sectors 802 of the large, sectored sprocket 820 are axially fed in the non-wrapped around region of the chain 812.

FIG. 6 illustrates a state of the toothed sectors 803, in which the latter are not able to move into alignment with the chain due to the fact that they are being shifted in the wrapped-around region of the chain. Such a state will transitionally occur on a regular basis when changing between gears. In doing so, the toothed sector 803 collides with the chain 812. Since the actuation plate 806 is forcibly displaced in the axial direction, the leaf springs of the guide pins 805 will open. The leaf springs 813 serve as force and path limiters. The toothed sector 803 is thus automatically stopped and will not move out into alignment with the chain before it has reached the non-wrapped-around region of the chain and is thus released. If, in an alternative approach, the rotating part is considered as a reference system, the chain will move away from the smaller sprocket sector, thus clearing the path for displacing the toothed sector into alignment with the chain.

FIG. 7 shows the collision of the large sprocket sectors 802 with the chain 812. What has been said above with reference to FIG. 6 for the sprocket sectors 803 applies analogously to the release, in which case the leaf springs 813 of the guide pins 804 are opened.

The advantage of the above-discussed solution is that no contact will occur between the moving parts (chain 812, sprockets 810, 820, 830) and the control mechanism proper, which effects the axial displacement, even during the shifting procedure itself. This will minimize friction and noise generation. A further advantage consists in that a system perfectly closed against penetrating dirt can be realized, which surrounds the control mechanism. This will ensure the functioning of the described mechanism even in the event of heavy dirt.

A further advantage results from the fact that no undesired movements of the individual sectors 802, 803 will take place even at very strong shocks, since they are fixed by springs 813 and the actuation plate 806.

Moreover, the absence of a stationary unit, which carries the control mechanism in other systems, enables better standardization. The space demand and the weight of a mechanism designed in such a manner are lower than those of conventionally known systems.

A further aspect of the invention relates to a solution for centrally introducing a force into a web connecting pins (such as the guide pins 804, 805 of FIG. 3), and hence achieving a fixed position of the sectored, divided or interrupted sprockets. The movement of the sectors is effected by control cams with locking functions located on the rotating unit, which are triggered in the shift point at a single, short touch by a carriage that is fixed relative to the moved shifting unit.

This principle of activation will be illustrated below by way of an exemplary embodiment depicted in FIGS. 8 to 13, in which three shiftable transmission ratios will be realized by the assembly.

Figure 8:
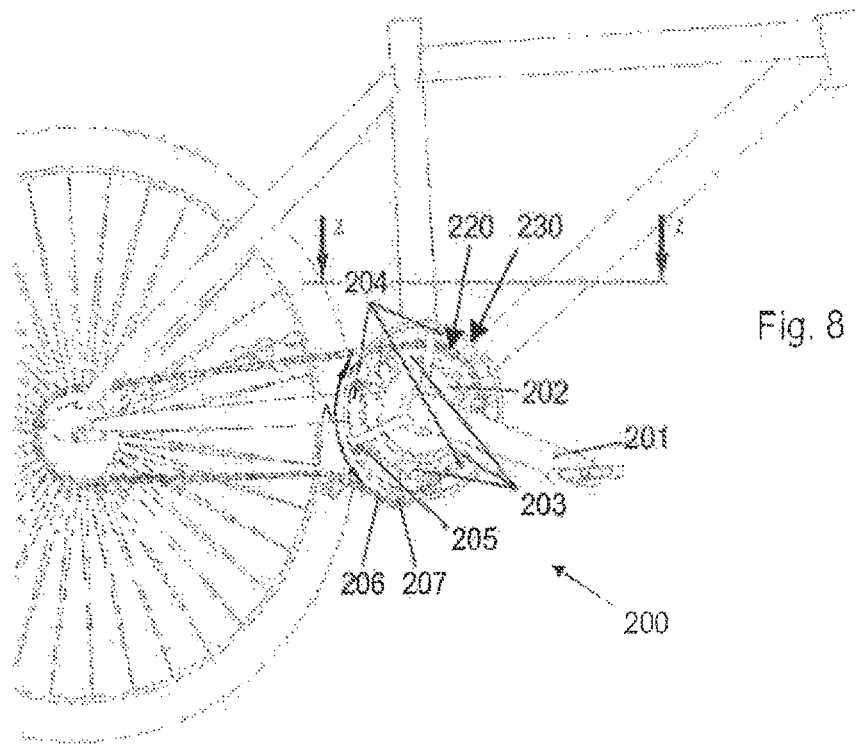
FIG. 8 depicts the gearing of a second exemplary embodiment in front view, on a bicycle (the bicycle being shown from the side)

The derailleur gear 200 of this exemplary embodiment, which is illustrated in FIG. 8, is located on the shaft of a pedal crank 201 of a bike. Three shiftable transmission ratios are achieved by changing the chain position between a small sprocket 202 firmly mounted to the crankshaft and two further sprockets 220 and 230 each sectored by three parts 203, 204. A guide disc 205 is provided to outwardly secure the axial position of the chain. The region that is not wrapped around by the chain 206 (indicated by the double arrow arc A) can be additionally enlarged by at least one guide roller 207 deflecting the chain e.g. downwardly.

FIG. 9 is a rear view of the derailleur gear 200 mounted on the bike. The toothed sectors 203 and 204 are each axially guided on the carrier plate 208 by a pair of pins 209. Also apparent are a chain tensioner 210, the holding plate 211 of the control carriage 212 with its associated Bowden cable 219. In FIGS. 8 and 9, the chain is illustrated wound around the chain blade 220 of the central gear.

FIG. 10 depicts the mechanism for changing the transmission ratio for the wheel set of FIGS. 9 and 8; the sense of rotation of the wheel set (during forward run) is counter-clockwise in FIG. 10 (arrow W). Two guide pins 209 are each provided per toothed sector 203, 204 and each connected by a web 214. A control cam 215 and an uplifter 216 are located in the center region of each web. On each of the (presently six) webs 214 are seated two leaf springs 217 to hold down the web in the direction of the carrier plate 208. In this manner, the associated assembly comprising the toothed sector, pin and web is pressed into alignment with the chain. Unless the respective gear is engaged, movement into alignment with the chain will be prevented by the erected control cam. This arrangement of the components similarly applies to all toothed sectors 203, 204.

FIG. 10A is a partially sectioned, enlarged detailed view showing the control cam 215 and the uplifter 216, which are guided in the web 214 in a manner firmly connected by a common axle 218. A recess in the carrier plate 208 enables further rotation of the uplifter 216, since the latter would otherwise collide with the carrier plate due to its length.

Figure 11:
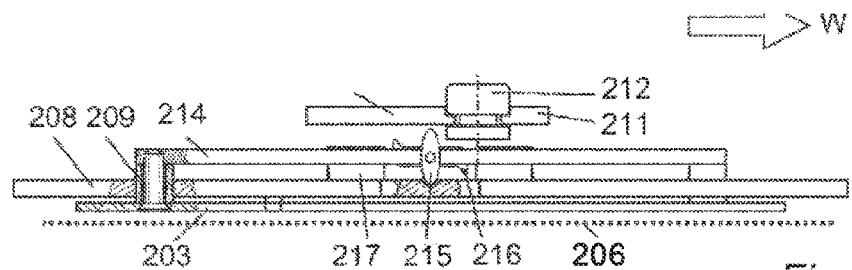
FIG. 11 is a simplified front view of the mechanism to illustrate the shifting of a gear, with the gear disengaged in FIG. 11.
Figure 12:
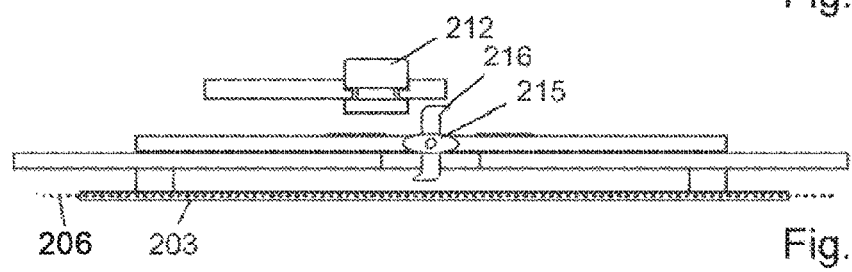
FIG. 12 is an illustration analogous to FIG. 11, yet with the gear engaged.

FIGS. 11 and 12 illustrate the changing of a gear by simplified front views (corresponding to front views along line A-A of FIG. 10), in which only one toothed sector 203, web 214, control cam 215 and uplifter 216 as well as the control carriage 212 fixed in its carrier plate 211 are shown for the sake of clarity. Arrow W indicates the direction of movement of the rotating unit. In FIG. 11, the toothed sector 203 is in the retracted position, i.e. outside the alignment of the chain (symbolized by broken line 206). The gear is thus not engaged. The control cam 215 is upright. FIG. 12 shows the engaged gear. The control cam 215 was pushed down by the control carriage 212 passing by. By pushing down the control cam 215, the uplifter 216 is erected, thus pushing the toothed sector 203 into the alignment of the chain. When the control carriage 212 is retracted again, the control cam 215, which is located on the same shaft, will be re-erected upon contact with the uplifter 216, thus moving the sprocket sector again out of alignment with the chain.

Due to this central force introduction by the control cam 215, which serves to move the sector, canting of the guide pins will be prevented. The spring force of the leaf springs 217 causes the return of the toothed sectors into their starting positions with the control cams turned down. The leaf springs 217 thus hold down the web 14; when the control cam 215 is activated, it will erect the web against the force of the springs 217.

The use of control cams with locking functions ensures that only a one-time contact will occur between the rotating unit and the fixed carriage at the actual time of shifting, i.e. upon contact of the control carriage 212 with the control cam 215 and the uplifter 216, respectively. Thus, no operating noise will be created by dragging parts. Besides, the toothed sectors will always be in a fixed, forced position.

Figure 13:
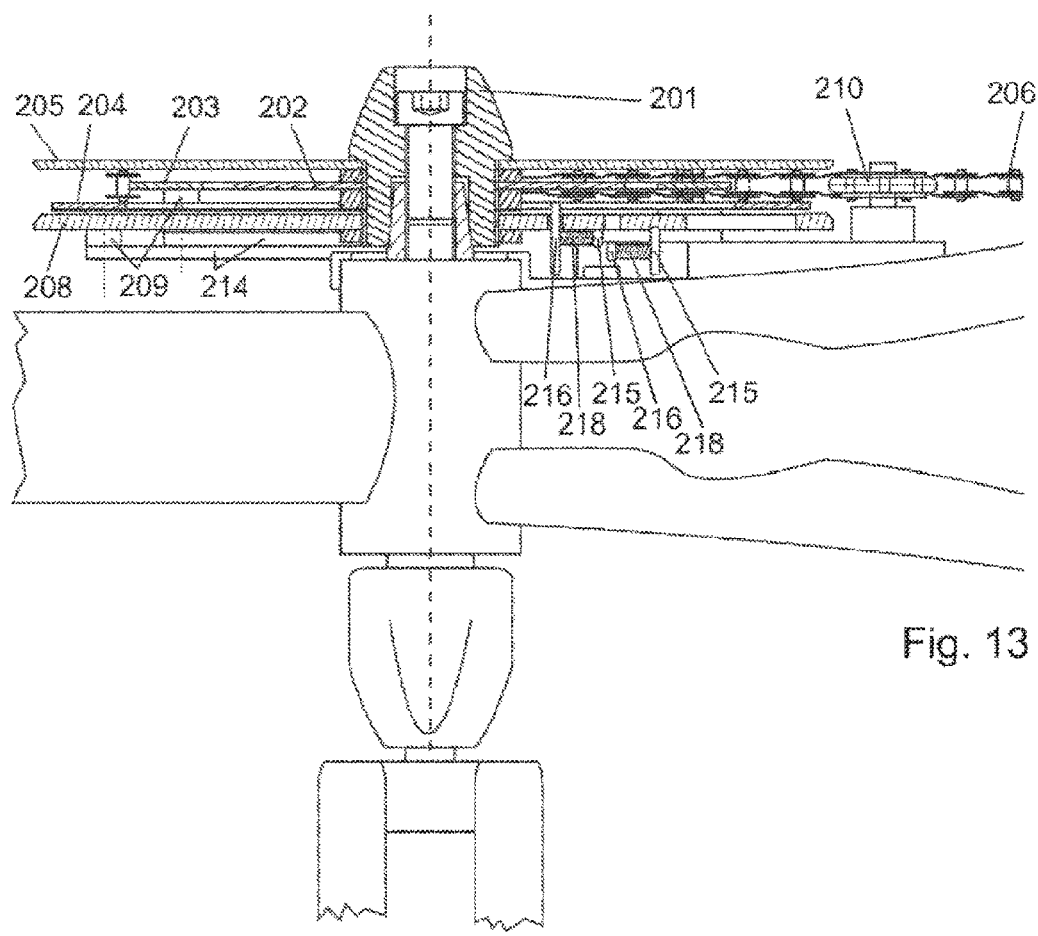
FIG. 13 illustrates the gearing of FIGS. 8 to 10 as a shifting unit provided on a bicycle, in front top view.

FIG. 13 illustrates the above-described preferred arrangement as a control unit located on a bike in a top front view. Also shown is the crank 201 and part of a pedal on the left side (at the bottom of FIG. 13) of the wheel; the right side of the crank is not illustrated for the sake of simplicity.

A third aspect of the invention relates to the guidance of the wheel sectors by switch rollers, at least in the non-wrapped-around region of the chain (or power-transmitting medium). It is, in particular, possible to hold the sectors/components of the drive/driven wheels in the non-wrapped-around region of the chain (or belt) by switch or guide rollers that are in constant contact.

Figure 17:
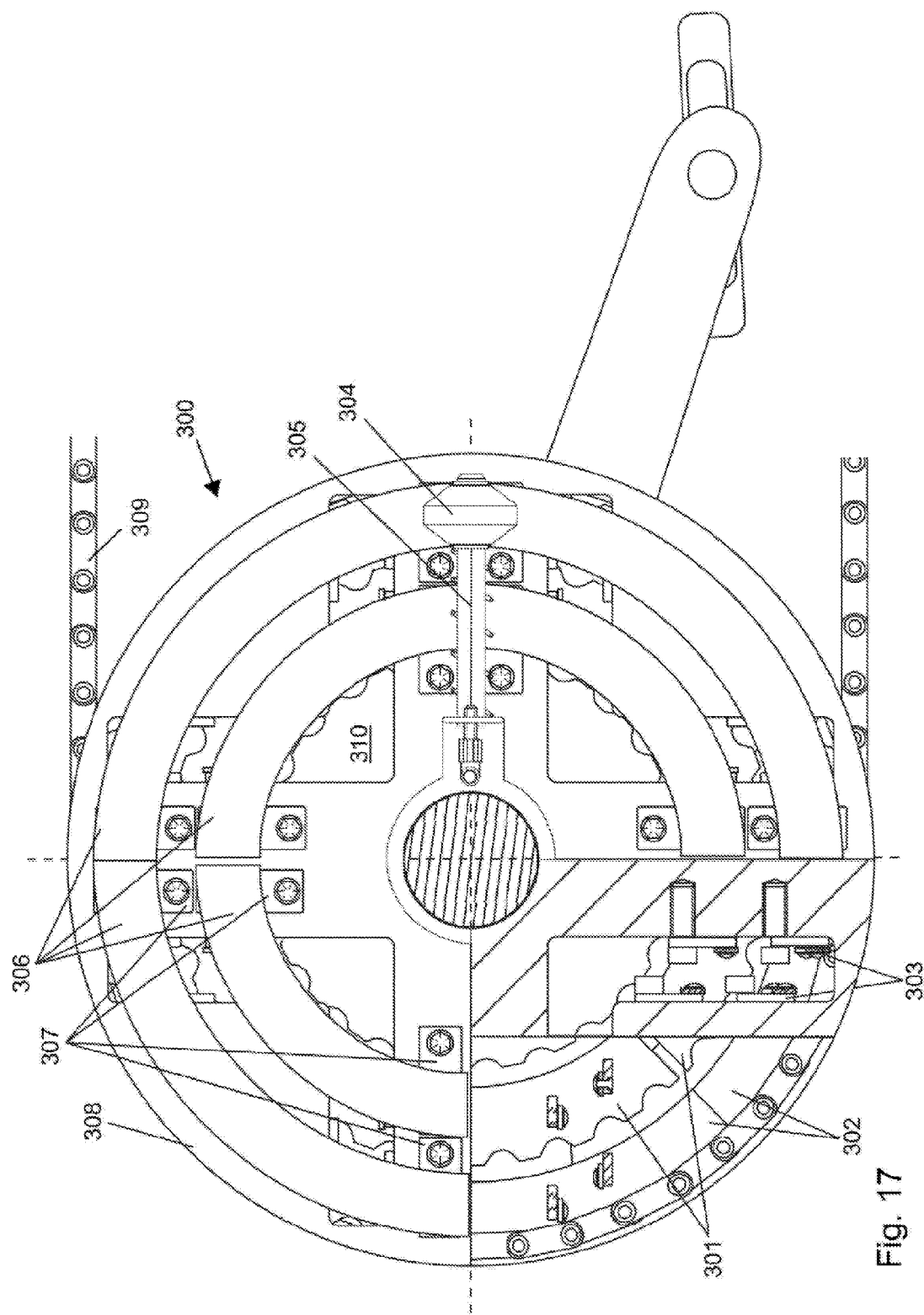
FIG. 17 is a rear view of the gearing comprising the mechanism of FIGS. 14 to 16.

This principle of guidance is illustrated below by way of a further exemplary embodiment of a control mechanism 300 according to the invention, which is depicted in FIGS. 14 to 16. FIGS. 14 to 16 show front views with differently engaged gears; FIG. 17 is a partially sectioned rear view along line A-A of FIG. 16. In this embodiment, toothed sectors 301 and 302 are articulately or flexibly fastened to four tilting levers 303 each, the latter being each mounted on the carrier plate 308 about a fulcrum. These tilting levers 303 constitute tilting holders for the associated toothed sectors so as to enable the parallel guidance of the toothed sectors in the axial direction. FIG. 15 depicts a position with the toothed sectors 301 of the central sprocket 320 in alignment with the chain, while in FIG. 16 the sectors 302 of the large sprocket 330 are activated. In FIG. 14, all of the sprockets are out of alignment with the chain 309 such that the latter is running on the innermost sprocket 310. As is apparent, the sprocket sectors 301, 302 are forcibly displaced on guide rails 306 by a guide roller 304 mounted within the sprocket assembly. This guide roller 304 moves on a stationary (i.e. non-rotating) axle extending in the radial direction and can be displaced relative to the center of the rotating unit by the aid of a Bowden cable 305.

Depending on the position of the guide roller 304 (control component), a respective sprocket sector is coupled into alignment with the chain via the respectively operated guide rail 306 (thrust element). An edge disc 311, which serves as a guide and limiter for the chain 309, is also provided in this case.

It is also possible to provide several guide wheels, the number of guide wheels being variable as a function of the number of sectors in a sprocket. It is, however, not necessary to provide guide wheels for those sector regions which are wrapped around by the chain, since in those regions the involved sprocket sectors are held in position by the chain itself. This is why in the exemplary embodiment according to FIGS. 13 to 17 only one guide roller is required, the latter being sufficient for positioning the sectors in the non-wrapped-around region. If the sprocket sectors are beyond guidance by the guide roller due to the rotary movement, they will be maintained in position by the chain itself. The self-maintaining function in this case is provided in that the toothed sectors, in addition to being axially displaced, are also displaced in the direction towards the center in order to align with the chain; this is due to the lateral tilting movement of the tilting levers 303. The automatic return of the sprocket sectors 301, 302 will thus be prevented by the chain itself, since the latter will not allow the toothed sectors to move out of the center by wrapping around the same.

The return of the sectors is effected by leaf springs 307 associated with the sprocket sectors 301, 302. Two leaf springs 307 located between the carrier plate 308 and the guide rails 306 are, for instance, provided for each sprocket sector.

The advantage of this embodiment of the gearshifting mechanism resides in its structural simplicity. The individual sectors need not be mechanically locked or retained in the non-wrapped-around region of the chain, thus rendering the actuation mechanism per se simpler. The solution of the switch roller movable on an axle constitutes a solution that is structurally very simple and hence economical.

This aspect of the invention results in the further advantage of the system being less prone to contamination, since the toothed sectors are not guided on pins, but are rather displaced by components that are tilted about a fulcrum. Sliding pins tend to become sluggish due to dirt penetrating between the slide surfaces. In general, it can be said that the guidance of the toothed sectors according to this embodiment will prevent the individual sectors from jamming. Another advantage of this embodiment is that the sectors are fed and removed in parallel with the alignment of the chain, which will result in a further reduction of the space demand.

Figure 18:
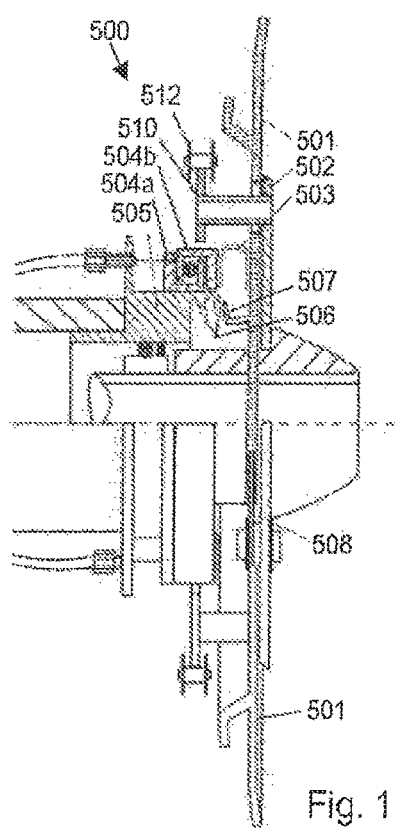
FIG. 18 shows yet another exemplary embodiment of a control mechanism, in which the sectors are actuated by a template.
Figure 19:
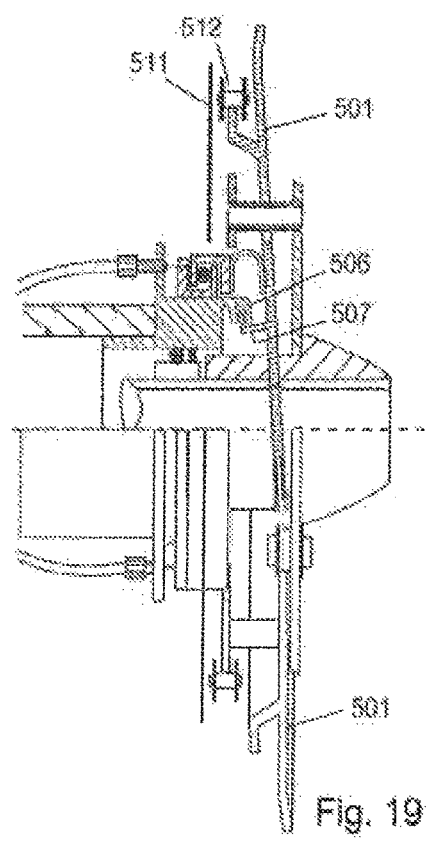
FIG. 19 depicts the control mechanism of FIG. 18 with a sector engaged.

A further aspect of the invention enables rapid actuation by a template. This is illustrated in FIGS. 18 and 19, which represent front views of an exemplary embodiment of a two-gear shifting system 500, the gear depicted in FIG. 18 being switched by an axially fixed, small sprocket 510 and the further gear, which is depicted in FIG. 19, being switched by a sprocket comprised of several sectors 501. In this embodiment, all of the sectors 501 are simultaneously tensioned and released via a rotationally decoupled mechanism comprised of a fixed ring 504a and a part 504b co-rotating with the sectors 501; the ring 504a corresponds to the control component and the part 504b to a thrust element in the sense of the invention. The sector block 501 formed over the center is fastened to the carrier plate 502 by the aid of a leaf spring 508. The movement of the sector blocks 501 is, however, prevented by a template 505 comprising annular webs 506, on which guide projections in the form of projecting feet 507 of the sectors 501 are supported. This is effected as far as to a control point, since the webs 506 are interrupted at one point of the template 505. In the switching point proper, the respectively concerned sector is released in the axial direction, whereupon rapid shifting of the sector block 501, which is prestressed by the spring 503, follows. The leaf spring 508 presses the sector 501 towards the starting position depicted in FIG. 18; by introducing the shifting force by means of the rotationally decoupled Bowden cable, the sector block is stepwisely deflected with the sectors being fed into the alignment of the chain 512. The illustration of the engaged position with the sector 501 turned on is depicted in FIG. 19. In addition, a guide disc 511 may be provided to limit a possible evasion of the chain 512 to the side facing away from the sectors 501—e.g., to the rear side in this embodiment.

FIG. 20 illustrates in side view a further embodiment 600 relating to this aspect of the invention. Here, the sectors of the central sprocket 620 and the large sprocket 630 are fastened, e.g. screwed, to a carrier plate 640 on a common leaf spring 601 in an overlapping carrier arrangement 604, thus again forming sector blocks. The leaf spring 601 is again mounted to the pin 602 of the smallest, undivided sprocket 610 in order to keep the diversity of parts low.

FIG. 21 is a sectional view of the embodiment of FIG. 20 along line A-A. It is apparent how the sectors 621, 631 of the sprockets 620, 630 are fastened to the carrier plate 640 at different angles relative to the same. Also apparent are the shaft 605 and the crank attachment piece 603 (which are not shown in FIG. 20 for reasons of clarity) as well as the chain 606.

The interlaced arrangement 604 of the carrier plates 640, which to this end are each provided with a bridge or formation (protrusion) 641, enable the mounting of the toothed sectors on the diameter very far outside. This will, in turn, enhance the stiffness of the system. Due to this constructive measure, the space within the smallest sprocket will also be kept free so as to enable the realization of a control mechanism arranged to pass through the smallest sprocket. Such a throughpassing control mechanism has been described above with reference to FIGS. 18 and 19.

A special merit of this configuration resides in the mounting of the sprocket sectors by means of resilient elements. As is apparent, the sectors, which are combined to a block, are flexibly mounted by the aid of leaf springs 601 so as to be able to be moved into, and again out of, alignment with the chain on demand. This mounting solution renders the system largely insensitive to dirt. Moreover, it results in a simplified structure, since the restoring force upon unilateral activation is likewise already provided by the spring element, thus making a return spring superfluous.

Figure 22:
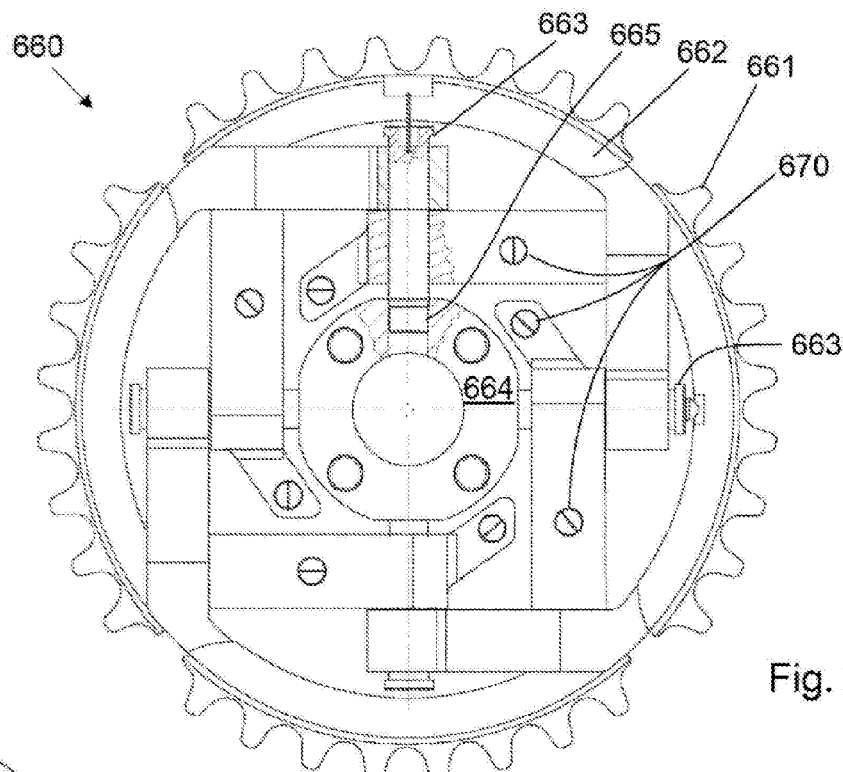
FIG. 22 illustrates a further exemplary embodiment with the toothed sectors mounted on tiltable carriers and retaining pins, in side view from outside.

A variant of this aspect is illustrated in FIG. 22. In this exemplary embodiment 660, the toothed sectors of the large sprocket 661 (the smaller sprockets have been omitted for the sake of clarity) are attached to carriers 662, which are retained on arms or retaining pins 663 capable of being tilted along the axial direction. The illustration according to FIG. 22 shows the upper one of the retaining pins 663 in section; otherwise, FIG. 22 is an external side view. The retaining pins 663 extend substantially radially, wherein the angle relative to the axle is adjustable to a certain extent, thus directly resulting in a tilting of the associated toothed sectors of the sprocket 661 relative to the axle as a function of said angle. To this end, the retaining pins 663 are fastened close to the axle, for instance to a paraxial mounting ring 664, in such a manner as to be pivotable relative to the axle in regard to their angle, similarly to the spokes of an umbrella. The inner end of each arm/retaining pin 663 is preferably fastened by means of a pin 665 extending in the circumferential direction of the ring 664 and mounted so as rotate about the same (the pin thus defining the axis of rotation of the pivotal movement). The carriers 662 are attached to the arms 663 as described below.

Figures 23, 23A, 23C:
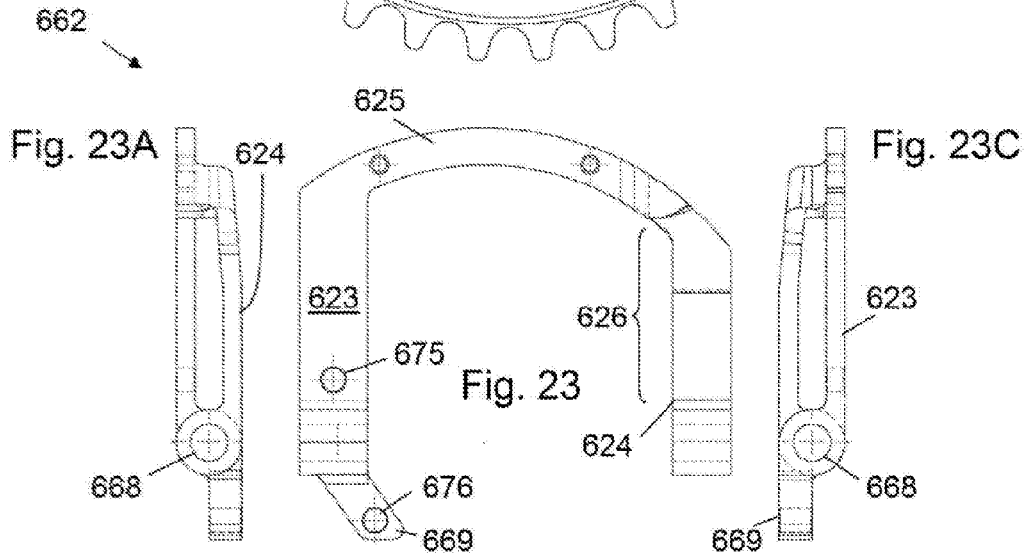
FIG. 23 is a side view of a carrier of the exemplary embodiment of FIG. 22.
FIG. 23A to 23C depict further views of the carrier of FIG. 23, namely from right, from top, and from left.
Figure 23B:
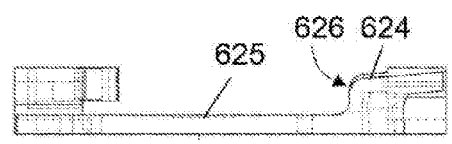

In FIGS. 23, 23A, 23B and 23C, the U-shaped carrier 662 is shown in several views. The carrier 662 has two leg portions 623, 624 that are connected by a bow-shaped outer portion 625. In the end region of the two legs 623, 624, a bore 668 is each formed, through which an arm/retaining pin 663 can each be passed. Leg 624 on the right side of FIG. 23 provides a bridge or formation 626 (protrusion; cf. FIG. 23A). The leg on the left side of FIG. 23 additionally comprises a projection 669 extending the carrier beyond the connection line of bores 668 (downwardly in FIGS. 23, 23C). Each carrier 662 is fastened to two mutually opposite arms 663 via said bores 668. In the mechanism, several carriers 662 are disposed about the axis of rotation in a rosette-like manner as illustrated in FIG. 22, using the formations 626 of the carrier legs 624. As illustrated, the fastening in the bores 668 can be articulately or, alternatively, elastically deformable in order to enable the slight tilting of the carriers 662 relative to the plane extending perpendicularly to the axis of rotation—optionally in combination with a small compensation movement in the longitudinal direction of the retaining pins. Thus, two oppositely located carriers 662 each share an arm/retaining pin 663 in the embodiment illustrated. This contributes to a reduction of the variety of parts. In a variant, each of the carriers 662 can, of course, also be retained on a respective separate arm or retaining pin per arm.

Hence results the advantage that, due to the large length of the arms, measured relative to the center (i.e. the perforation point of the axis through the plane of the sprocket 661 in the stretched state), the toothed sectors only have to make very small angular movements to completely come out of engagement with the chain and into a region not wrapped-around by the chain.

As for the rest, the exemplary embodiment 660 corresponds to that explained above with reference to FIGS. 20 and 21. The positions 670 clearly indicate the points where the control components and thrust elements are attached in the sense of the invention, e.g. in the manner of elements 503-505, in order to trigger the adjustment of the carriers 662 or sprocket 661. In this respect, one position 670 is each provided on each carrier on different sides of the tilting axis, for instance one 675 on leg 623 and, opposite thereto, one 676 on projection 669 in the example of FIG. 23. The number of distribution of the sprockets, e.g. four toothed sectors each here, may, of course, again vary and is not limited to four.

A further aspect of the invention relates to the fixation of the stop position of sprocket sectors by the aid of a resilient element. A wheel-rim or sprocket sector is moved beyond the dead center between the two stop positions by spring action, one of the stop positions being the position within the plane of alignment of the chain (or belt etc.), the other position being a resting position outside the plane of alignment.

The front views indicated in FIGS. 24 and 25 illustrate a first exemplary embodiment of the stop position fixation, which is based on the exemplary embodiment of FIG. 22. The sprocket sector 671, the carrier 672 and the pin 673 respectively correspond to the components 661, 662, 663 of FIG. 22; deviating from that embodiment is the connection between the carrier 672 and the pin 673, which is realized by the aid of an elastic connecting pin 674 providing a play in the axial direction between the carrier 672 and the pin 673. The connecting pin 672 is clamped/fastened on the outer end of the pin 673, on the one hand, and on a fastening point (e.g. nose) of the carrier 672 in the extension line of pin 673, on the other hand. The connecting pin 674 has a small excess length, thus evading the central position and bringing the carrier 672—and hence the sprocket sector 671 retained thereon—as far as to the stop; this movement is enabled by a slightly elastic deformation of the outer portion 625 of the carrier 662 and/or the connecting pin 674. This defines the two stop positions each shown in FIGS. 24 and 25, between which the sector 671 is able to snap to and fro as a function of its actuation.

Such actuation can, for instance, be effected by the aid of projections 675, 676 which are provided on the carriers 672 at different radial distances from the wheel axle (in particular at attachment points 670 in FIG. 22) and can, for instance, be designed as pins. The projections act as thrust elements in the sense of the invention and extend through the toothed wheel of the smallest sprocket (not shown in FIGS. 24-28). During a rotation, the projections 675, 676 are moved past a rocker-shaped switching lever 677 ("rocker switch"), which is rotationally fixed. In FIG. 26, the rocker switch 677 is visible from top. The rocker switch 677 is movable between two positions as indicated in FIG. 26 by the double arrow. In a first position, one arm of the rocker switch 677 is within the range of motion of the first projection 675 (and out of engagement with the second projections 676), which is why the rocker switch 677 presses against the same, thus moving the carrier 672 out of the position of FIG. 24 and into the position of FIG. 25. Switching into the position of the sector outside the plane of alignment of the chain is thus effected. If, on the other hand, the lever is in the second position, it is out of engagement with the first projections, yet acts on the second projections 676; since the latter are provided on the carriers 672 opposite the first projections, a force action returning the carrier 672 into the position of FIG. 24 results.

A variant comprising a different realization of the stop position fixation is depicted in FIGS. 27 and 28. In this case, a ball 684 is pressed against an inwardly oriented, wedge-shaped projection 686 by the force of a spring, e.g. a compression spring 685, which wedge-shaped projection is, for instance, formed on the inner edge of the bow-shaped outer portion of the carrier 672'. This defines the two stop positions each illustrated in FIGS. 27 and 28, between which the sector 671 is able to snap to and fro as a function of its actuation.

In this manner, the resilient element 674, 684 enforces a forced movement of the sector 671 beyond the dead center between the two stop positions. The fixation of the stop positions by the aid of a resilient element can, of course, also be used in other configurations of the thrust elements of the wheel rim sectors, including the inventive embodiments shown herein, and is not limited to that depicted in FIG. 22.

Figures 29, 30:
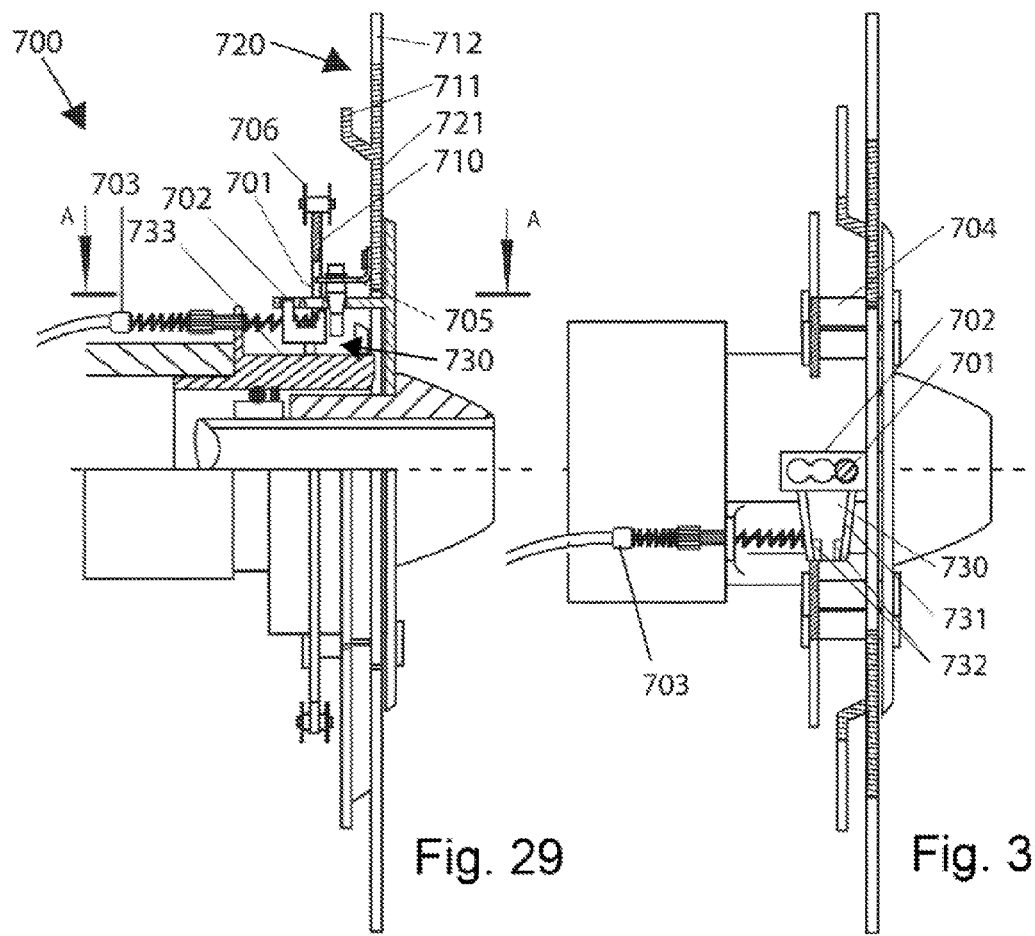
FIG. 29 is a front view of another exemplary embodiment, partially sectioned along a radial plane, comprising a gearshift via an axially displaceable pivot.
FIG. 30 is a side view from inside, of the mechanism according to FIG. 29.
Figure 31:
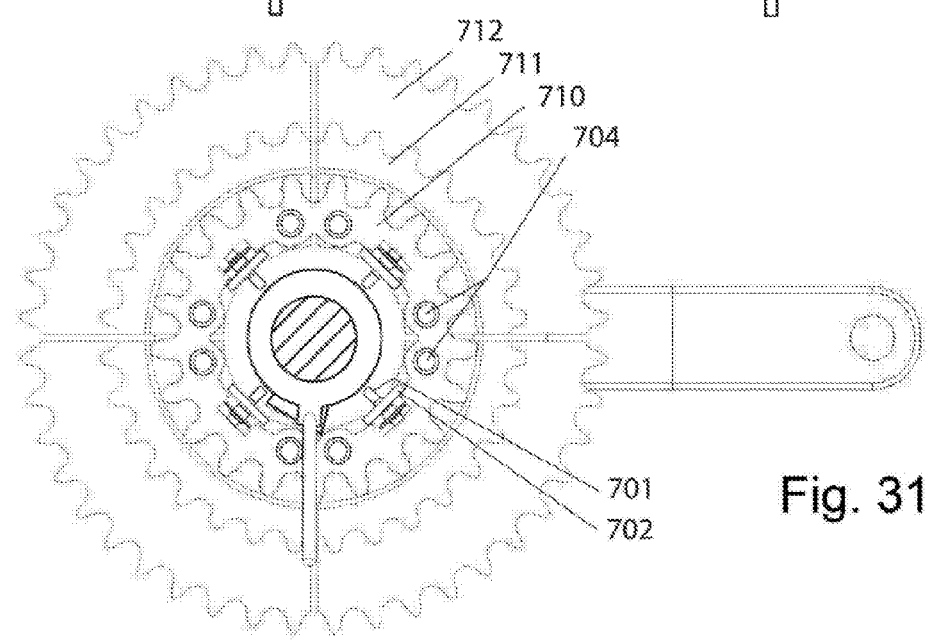
FIG. 31 is a sectional top view of the mechanism along sectional line A-A of FIG. 29.

In yet another aspect of the invention according to FIGS. 29 to 31, the introduction of the shifting force takes place over an extended angular path by the sprocket sector running onto a ramp held in an axially resilient manner. At the same time, rapid actuation upon selective release from the spring-biased position is enabled.

In this embodiment of a gearshift 700, the sectors 711, 712 belonging to the same angular range, of the different sprockets (again, with the exception of the smallest sprocket) may be located on a sector block 720 in a mutually rigidly fastened relationship. This axially movable sprocket sector block 720 is axially displaced, by force action, onto a pivot 701 fastened to the sector block 720 by the aid of, for instance, a resilient retainer 705, and projecting towards the center in the radial direction. A shifting carriage 730 is provided close to the axle, which is arranged to be axially displaceably on a cylindrical surface 733 and configured as a ramp, preferably a double ramp. During the shifting procedure, the shifting carriage 730 is axially displaced upon actuation by means of a Bowden cable 703 that is spring-mounted in both directions. By the pivot 701 over-running the lateral guide rails 731 of the shifting carriage (during the rotary movement of the sector block 720 to which the pivot 701 belongs), the shifting carriage is braced against the springs. On its end, the shifting carriage 730 comprises a radial ramp or elevation 732 to lift the pin radially, thus releasing it from the catch 702. This causes the pivot 701 to rapidly jump into another opening of the catch 702. The catch 702 thus defines a limited number of forced positions for the pivot 701, each of which corresponds to a respective gear.

This mode of construction enables the shifting procedure to be kept very short such that the available free region of the chain 706 will be sufficient to perform the shifting procedure during the rotation of the unit. Hence, no further deflection pulleys are required to enlarge said region.

A special merit of this embodiment is that the shifting force is built up over a relatively long path in the rotary movement and released at a defined point by unlocking the prestressed unit. This enables an advantageous, short shifting procedure.

Also in this configuration, the engagement of the central control mechanism through the small, undivided sprocket 710 with the sector blocks 720 is realized by passing through within the sprocket 710. The sector blocks 720, each of which comprises a base plate 721, a central sprocket sector 711 and a large sprocket sector 712 in this exemplary embodiment, are axially mounted on two pins 704 each. Thus, a very compact and highly standardized design with high compatibility has become possible.

Figure 33:
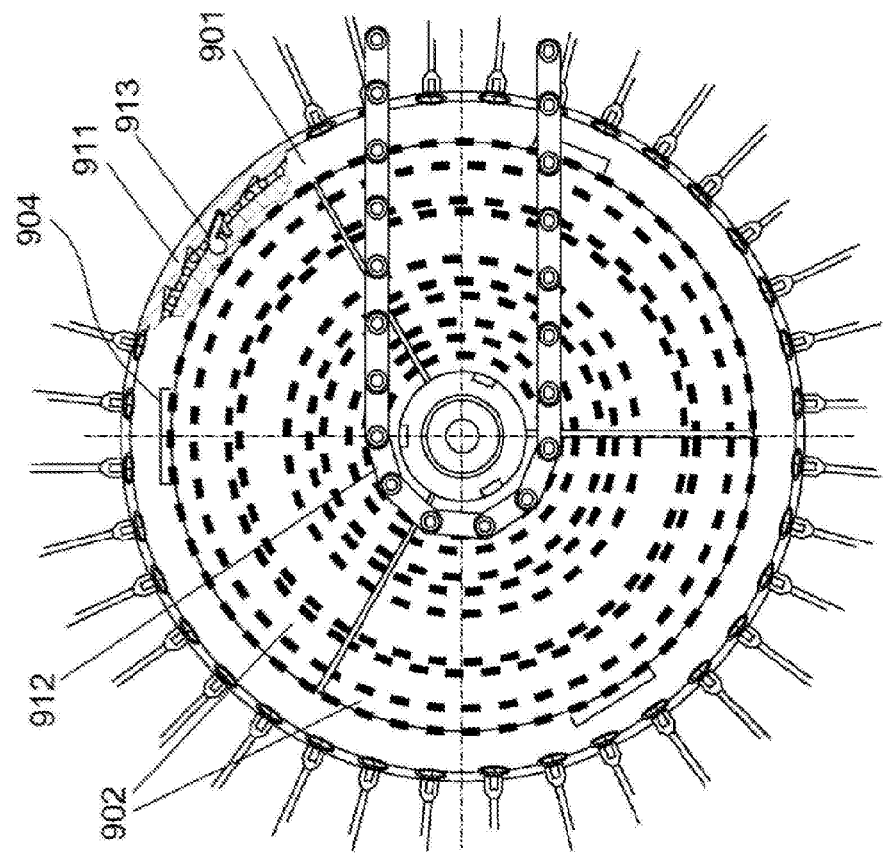
FIG. 33 is a front view of the control mechanism of FIG. 32.

Yet another aspect of the invention relates to the already mentioned combination of sprocket sectors to sector blocks, which are additionally housed in an encapsulated unit—encapsulation. This is exemplified by the exemplary embodiment illustrated in FIGS. 32 and 33, which depict a front elevational view (with the upper half again sectioned) and a front view, respectively, of the encapsulated control mechanism 900.

Figure 32:
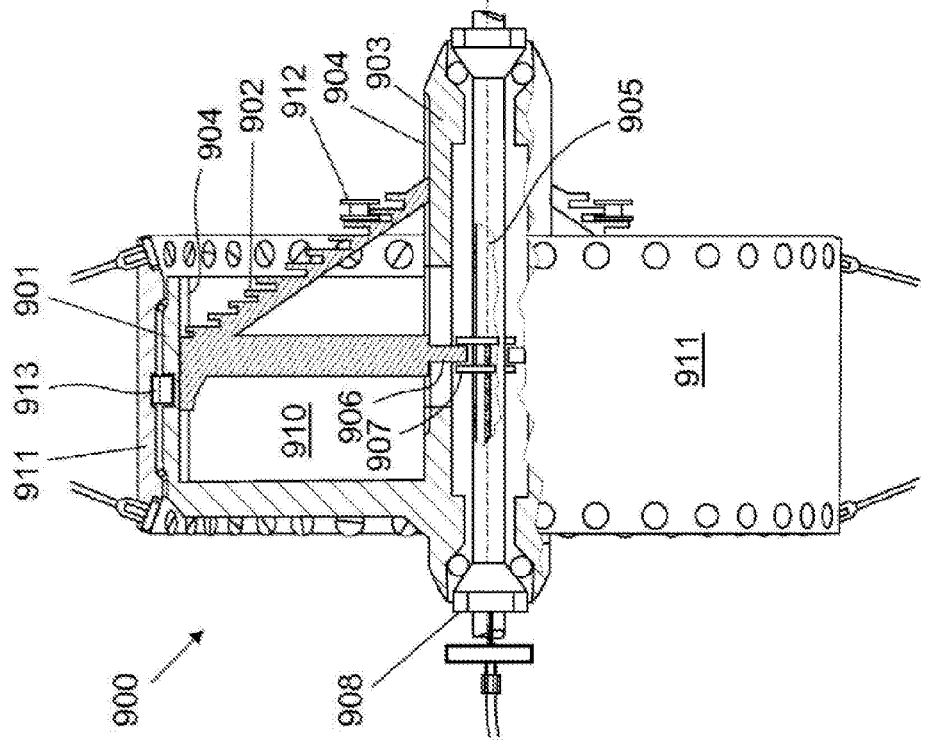
FIG. 32 shows yet another exemplary embodiment of a control mechanism in a partially sectioned front view, wherein toothed sector blocks are axially displaced and, in addition, are integrated in a casing.

A casing 901 ("gearshift casing") surrounds the sprocket sector parts located outside the plane of alignment of the chain 912, i.e. to the left of the plane of alignment in FIG. 32. The casing 901 is, for instance, formed in the interior of a wheel hub casing 911 to which the spokes of the wheel can be fastened. (Wheel spokes can of course be replaced with a wheel disk in a spoke-less bike, said wheel disc connecting the hub to the outer edge of the wheel, in particular a rim). The casing 901 is cylindrical or, as illustrated in FIG. 32, cup-shaped, thus surrounding a cavity 910. In addition, a central part 903 extending along the axis of rotation can be provided, which is advantageously connected to the casing in a rotationally fixed manner (e.g. formed in one piece). The sprocket sectors of the different gears are combined to blocks 902, one of which is visible in FIG. 32. The blocks 902 are movable in the axial direction within the casing 901. Each block 902 is progressively moved out of the casing 902 to such an extent that the sprocket sector of the desired gear will be aligned with the chain. In FIG. 32, the gear of the smallest sprocket has been selected.

Each block 902 is, for instance, guided on the inner edge of the casing 901 and/or on the outer side of the central part 903 by the aid of ribs, rails or grooves 904 extending in the axial direction, thus also effecting the transmission of force onto the wheel. The block 902 has a projection 906 extending towards the wheel axle into a central cavity 905 of the central part 903, which projection serves as a thrust element in the sense of the invention and engages an annular groove 907 of a rotationally decoupled adjusting device 908. The adjusting device 908 is mounted so as to be linearly adjustable in the axial direction, i.e. along the wheel axle, and rotationally decoupled.

The sprocket blocks—or optionally only individual sprocket sectors—are thus displaced in an axial movement through the plane corresponding to the plane of the wheel spokes. This will result in a particularly favorable exploitation and saving of space in a wheel equipped with a gearshift of this type. With wheel spokes that are inclined relative to the radial direction, the place where the wheel spokes are fastened to the wheel center (e.g. wheel hub) is preferably taken as a point of reference; the spoke part next to wheel plane (or farthest away from the same) in the axial direction can also be taken as a point of reference.

As is likewise apparent from FIG. 26, a freewheel 913 can be realized between the hub casing 911, which serves to connect the wheel spokes (or the wheel disc in the case of a spokeless wheel construction), and the (gearshift) casing 901 containing the mechanism with the sector block 902. The hub casing 911 surrounds the casing 901, e.g. in a ring- or cup-like manner, which is rotationally mounted in the hub casing 911; the hub casing 911 and the gearshift casing 901 together form the wheel hub of the wheel. The freewheel mechanism is designed in a known manner, allowing for the rotation of the casing parts about the wheel axle in one direction of rotation (only), yet blocking it in the other direction. Where no freewheel is required, it may be obviated; the casing parts 901, 911 can then be rigidly connected to each other or even designed in one piece, i.e. as a single casing.

A gearshift according to the invention can be attached to the drive shaft, e.g. the crank shaft driven by the pedals of a bike, or the shaft of a wheel such as the rear wheel of a bike or any other shaft, e.g. an intermediate shaft. FIG. 34 illustrates an example comprising a composite gearing. The drive power is transmitted by the crankshaft 1 via a first chain 2 to the transmission gear 3; from there, the rear wheel 5 is driven via a second chain 4. FIG. 34 depicts a variant in which the chains 2 and 4 run on the same sprocket group. In another variant, the two chains may operate on different sprocket groups, the two chains may, for instance, be arranged on different sides of the bike (i.e. each to the right and to the left, in FIG. 34 chain 2 might, for instance, be located behind the frame and hence on the left side of the bike), the shaft of the transmission gear communicating from one side to the other. Also here, one of the chains, or both chains, may of course be replaced with other traction means, e.g. a belt.

The mode of construction according to the invention, in particular, enables the chain (more precisely: the plane of alignment of the chain) to be arranged at a standardized distance relative to the frame of the bicycle of 50 mm.

It goes without saying that the aspects and embodiments of the invention shown and described herein, and their particulars, can be combined with one another. Also can the number of sectors or parts each belonging to a wheel ring (in particular sprocket) vary and assume a suitable value, e.g. two, three, four, five, six, eight or more, as a function of the respective embodiment.

The invention claimed is:

1. A control mechanism (200, 300, 500, 600, 660 700, 800, 900) for setting a transmission ratio between a traction means (206, 309, 512, 606, 706, 812. 912) and a wheel set that is rotatable about a wheel axle and includes two or more wheel blades (202, 220, 230; 310, 320, 330; 510, 520; 610, 620, 630; 710, 711, 712; 810, 820, 830) which can facultatively be wrapped around by the traction means,
wherein at least one of the wheel blades is composed of a plurality of wheel rim sectors (203, 204; 301, 302; 501; 621, 631; 661; 711, 712; 802, 803; 902),
wherein the wheel blades have different circumferential radii,
another wheel blade (202, 310, 510, 610, 710, 810) of the two or more wheel blades having the smallest circumferential radius and being undivided by having no independently adjustable sectors, the undivided wheel blade comprises at least one opening, through which extend one of at least one thrust element (504b, 701), at least one connection element (503, 702) associated to a thrust element, or both the at least one thrust element and the at least one connection element, the at least one connection element (503, 702) serving to connect the thrust element to the respective wheel rim sector (501, 721), and the control mechanism causes the adjustment of the wheel rim sectors relative to a fixed plane of alignment in a direction substantially transverse to the fixed plane of alignment, the fixed plane of alignment extending along the planar face of the another wheel blade, the control mechanism having
   at least one control component (212; 304; 504*a*, 505; 730; 807; 908) mounted decoupled from a rotary movement of the wheel set,
   a plurality of co-rotating thrust elements (216; 306; 504*b*; 701; 804, 805; 906), wherein the thrust elements are each associated to the wheel rim sectors and each of the wheel rim sectors is connected to the respectively associated thrust element so as to be rotationally fixed relative to the rotation about the wheel axle, wherein the thrust elements are each displaceable in an axial direction between a first position and a second position by couplings of the at least one control component, wherein the couplings are rotation-free in that the couplings do not rotate with the rotary movement of the wheel set, wherein the first position of each thrust element corresponds to an associated wheel rim sector being outside the fixed plane of alignment, whereas the thrust element being in the second position exerts on the associated wheel rim sector, at least as long the associated wheel rim sector is outside the fixed plane of alignment, a force for displacing the associated wheel rim sector into the fixed plane of alignment, the wheel rim sectors are independently adjustable relative to each other via the respectively associated thrust element.

2. A control mechanism according to claim 1, characterized in that the thrust elements are each connected to the associated wheel dm sectors and/or the control component by a resilient connection (303, 503, 813) providing a play in a direction transverse to the plane of alignment.

3. A control mechanism according to claim 1 or 2, characterized by a guide disc (205, 311, 511, 811) extending in parallel with the plane of alignment and mounted to co-rotate with the wheel set.

4. A control mechanism according to claim 1, characterized by additional spring elements (217, 307, 601, 508), for returning the wheel rim sectors into a resting position outside the plane of alignment when the associated thrust element assumes its first position.

5. A control mechanism according to claim 1, characterized by guide elements associated to the wheel rim sectors (203, 204. 301, 302, 802, 803) and configured as guide pins (209, 804, 805) or tilting brackets (303) through which substantially axial movements of the wheel rim sectors are defined, based on an action of force by the respectively associated thrust elements.

6. A control mechanism according to claim 1, characterized in that the wheel rim sectors (501, 640) are tiltable relative to the plane of alignment and fastened by means of a spring (508, 601), which exerts a force onto the wheel rim sectors for movement out of the plane of alignment.

7. A control mechanism according to claim 1, characterized in that the wheel rim sectors (501) comprise firmly connected, at least in the axial direction, guide projections (507) engaging an associated guide web (506) when the respective wheel rim sector is in the plane of alignment, said guide web (506) being mounted and decoupled from a rotary movement of the wheel set.

8. A control mechanism according to claim 1, characterized in that the undivided wheel blade is mounted on the wheel set so as to be immovabie in the axial direction.

9. A control mechanism according to claim 1, characterized in that the wheel blades are sprockets and the wheel rim sectors are sprocket sectors, wherein the traction means is a chain advantageously form-lockingly cooperating with teeth of the sprockets or sprocket sectors.

10. A gearshift comprising a control mechanism according to claim 1 mounted on a gearwheel.

11. A gearshift according to claim 10 used as a transmission gear and capable of being arranged between a driving gear group and a driven gear group of a vehicle, in particular bicycle.

12. A control mechanism according to claim 1, characterized in that the wheel rim sectors (501, 640) are tiltable relative to the plane of alignment and fastened by means of a spring (508, 601), which exerts a force onto the wheel rim sectors for movement out of the plane of alignment, wherein the wheel rim sectors (501) comprise firmly connected, at least in the axial direction, guide projections (507) engaging an associated guide web (506) when the respective wheel rim sector is in the plane of alignment, said guide web (506) being mounted and decoupled from the rotary movement of the wheel set, and the control mechanism includes additional spring elements (217, 307, 601, 508) comprising leaf springs for returning the wheel rim sectors into a resting position outside the plane of alignment when the associated thrust element assumes its first position.

\* \* \* \* \*